(12) United States Patent
Lin et al.

(10) Patent No.: US 12,278,547 B2
(45) Date of Patent: Apr. 15, 2025

(54) SELF-POWERED APPARATUS, BICYCLE AND INDOOR EXERCISE BIKE

(71) Applicant: GIANT MANUFACTURING CO., LTD., Taichung (TW)

(72) Inventors: Ching-Yao Lin, Taichung (TW); Hsiao-Wen Hsu, Taichung (TW); Chin-Lai Huang, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 244 days.

(21) Appl. No.: 17/810,839

(22) Filed: Jul. 6, 2022

(65) Prior Publication Data

US 2023/0019925 A1    Jan. 19, 2023

Related U.S. Application Data

(60) Provisional application No. 63/218,886, filed on Jul. 6, 2021.

(51) Int. Cl.
*H02K 7/18*    (2006.01)
*A63B 21/005*    (2006.01)

(52) U.S. Cl.
CPC ....... *H02K 7/1861* (2013.01); *A63B 21/0053* (2013.01); *H02K 2213/03* (2013.01)

(58) Field of Classification Search
CPC .............. H02K 7/1861; H02K 2213/03; A63B 21/0053; A63B 2209/08; A63B 2220/17; A63B 21/0054; A63B 22/0605; A63B 21/4034; A63B 2022/0611; A63B 2220/30; A63B 2220/35; A63B 2220/50; A63B 69/16; A63B 71/00; A63B 71/04; A63B 2022/0641; B62J 43/20; B62J 43/30; B62J 45/411; B62J 45/421; G01L 3/1457;
(Continued)

(56) References Cited

U.S. PATENT DOCUMENTS 9,063,026 B2    6/2015 Nassef
2002/0152835 A1    10/2002 Chang
(Continued)

FOREIGN PATENT DOCUMENTS

CN    103569301 A    *    2/2014
CN    109131710 A        1/2019
(Continued)

*Primary Examiner* — Thomas Truong
(74) *Attorney, Agent, or Firm* — CKC & Partners Co., LLC

(57) ABSTRACT

A self-powered apparatus is used for various kinds of cycling and indoor exercise devices. The self-powered apparatus includes a pedal unit, a spindle, a generator and an energy storage element. The pedal unit includes an inner surface to form an accommodating space therein. The spindle is accommodated in the accommodating space. The generator includes a stator and a rotor. The stator is disposed on the spindle, the rotor is disposed on the inner surface of the pedal unit, and the rotor surrounds the stator correspondingly and is non-contact with the stator. The energy storage element is electrically coupled to the generator. When the pedal unit is being pedaled to rotate by a rider, the stator is fixed on the spindle, the rotor rotates relatively to the stator and along with the pedal unit, and a power is generated by the generator to charge the energy storage element.

17 Claims, 26 Drawing Sheets

(58) Field of Classification Search
CPC ......... G01L 5/225; B62M 3/086; B62M 3/08; F03G 5/02; H02J 7/345
See application file for complete search history.

(56) References Cited

U.S. PATENT DOCUMENTS

| | | | | |
|---|---|---|---|---|
| 2014/0077648 | A1* | 3/2014 | Brauer | H02K 3/26 310/152 |
| 2014/0145525 | A1* | 5/2014 | Dooley | H02K 1/2706 310/51 |
| 2017/0297650 | A1* | 10/2017 | Hermansen | B62M 3/086 |
| 2022/0166270 | A1* | 5/2022 | Nigo | H02K 1/148 |

FOREIGN PATENT DOCUMENTS

| | | | |
|---|---|---|---|
| CN | 110040209 | A | 7/2019 |
| CN | 108712105 | B | 8/2020 |
| CN | 211266560 | U | 8/2020 |
| CN | 112298439 | A | 2/2021 |
| DE | 202018005992 | U1 * | 5/2019 |
| JP | 2015212108 | A * | 11/2015 |
| KR | 20140102870 | A | 8/2014 |
| KR | 101471392 | B1 | 12/2014 |
| KR | 20160058308 | A | 5/2016 |
| KR | 20190079878 | A | 7/2019 |
| TW | 306449 | U | 5/1997 |
| TW | M277688 | U | 10/2005 |
| TW | M318578 | U | 9/2007 |
| TW | I615175 | B | 2/2018 |
| TW | M566177 | U | 9/2018 |
| TW | 201946835 | A | 12/2019 |

\* cited by examiner

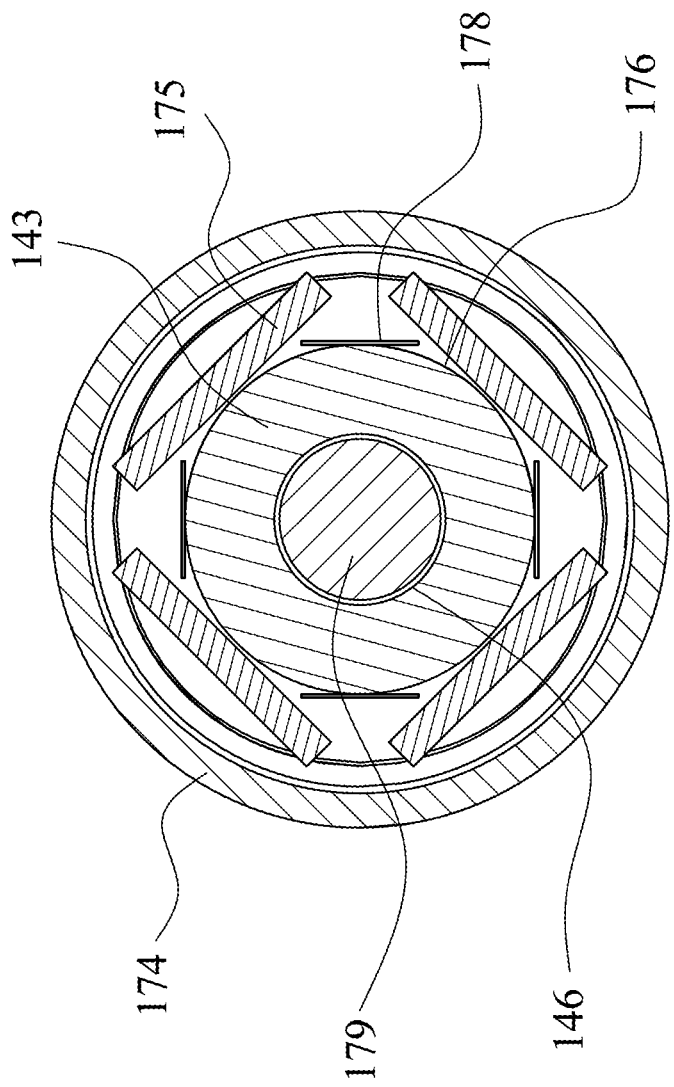

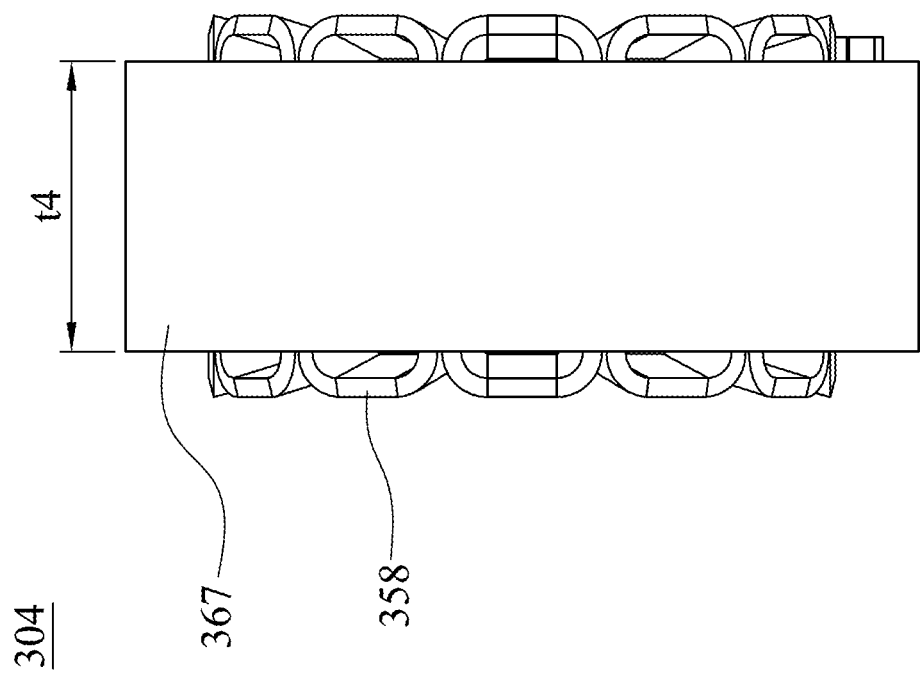

SELF-POWERED APPARATUS, BICYCLE AND INDOOR EXERCISE BIKE

RELATED APPLICATIONS

This application claims priority to U.S. Provisional Application Ser. No. 63/218,886, filed on Jul. 6, 2021, which is herein incorporated by reference.

BACKGROUND

Technical Field

The present disclosure relates to a self-powered apparatus, a bicycle and an indoor exercise bike. More particularly, the present disclosure relates to a self-powered apparatus being a power pedal, and a bicycle and an indoor exercise bike, which include power pedals.

Description of Related Art

With the increasing popularity of health and exercise activities, a bicycle or an indoor exercise bike is usually equipped with a conventional power pedal, which has at least one strain gauge or similar sensors for measuring riding data to provide a physical and cycling information of a rider while he or she is pedaling. However, frequently changing or removing the battery of the conventional power pedal to charge is inconvenient to the rider. Thus, there is a requirement or an incentive for improving the charging conveniences of the battery of the conventional power pedal.

SUMMARY

According to one aspect of the present disclosure, a self-powered apparatus is a pedaling and rotating apparatus for cycling. The self-powered apparatus includes a pedal unit, a spindle, a generator and an energy storage element. The pedal unit includes an inner surface to form an accommodating space therein. The spindle is accommodated in the accommodating space. The generator includes a stator and a rotor. The stator is disposed on the spindle, the rotor is disposed on the inner surface of the pedal unit, and the rotor surrounds the stator correspondingly and is non-contact with the stator. The energy storage element is electrically coupled to the generator. When the pedal unit is being pedaled to rotate by a rider, the stator is fixed on the spindle, the rotor rotates relatively to the stator and along with the pedal unit, and a generated power is generated by the generator to charge the energy storage element.

According to another aspect of the present disclosure, a bicycle includes the self-powered apparatus as the aforementioned. The self-powered apparatus is a power pedal apparatus of the bicycle.

According to further another aspect of the present disclosure, an indoor exercise bike includes the self-powered apparatus as the aforementioned. The self-powered apparatus is a power pedal apparatus of the indoor exercise bike.

BRIEF DESCRIPTION OF THE DRAWINGS

The present disclosure can be more fully understood by reading the following detailed description of the embodiment, with reference made to the accompanying drawings as follows:

FIG. 1E is a cross-sectional view along line 1E-1E of FIG. 1C.

FIG. 3F is a side view of the generator of the self-powered apparatus according to FIG. 3E of the 3rd embodiment.

DETAILED DESCRIPTION

Figure 1A:
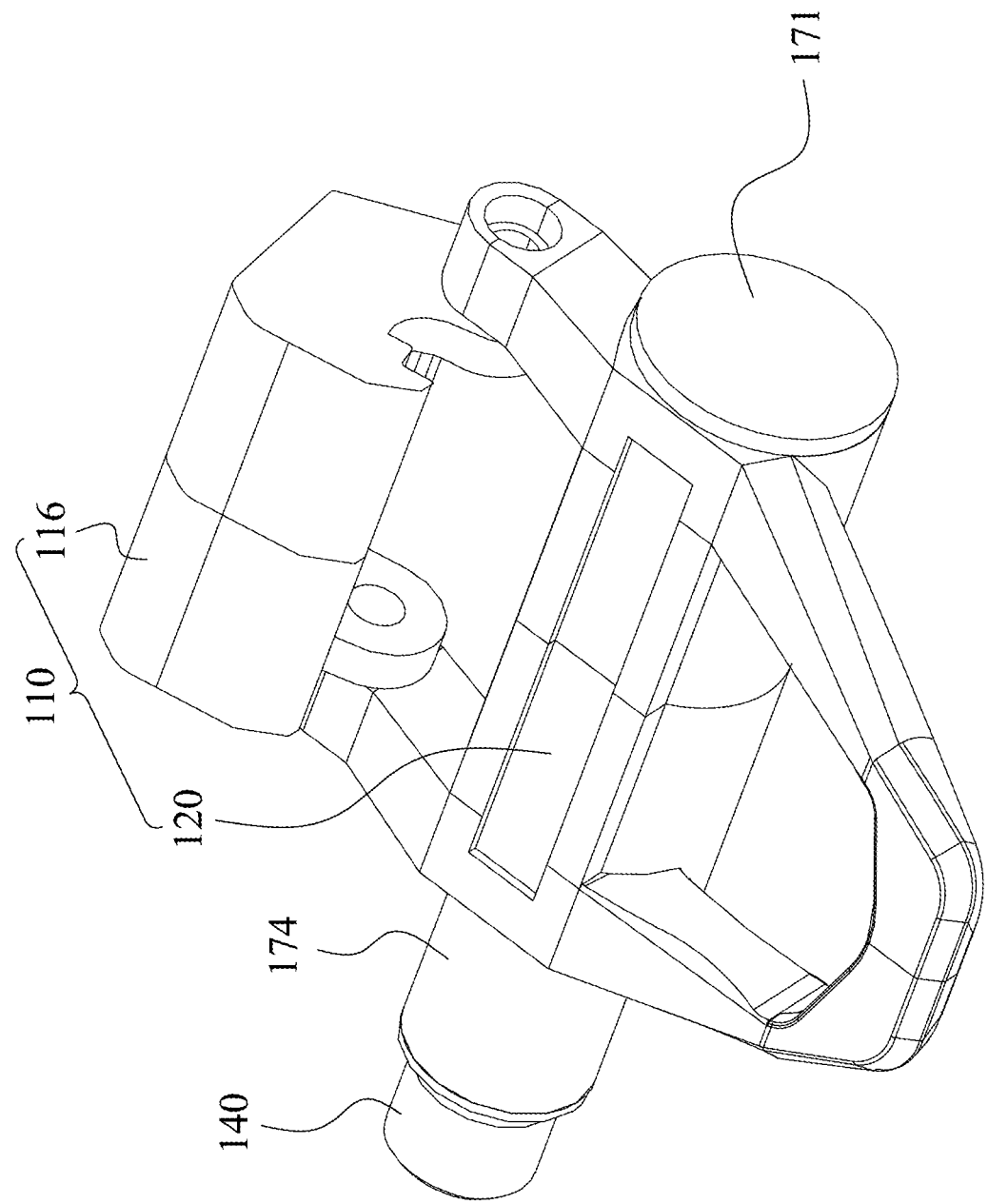
FIG. 1A is a three-dimensional view of a self-powered apparatus according to the 1st embodiment of the present disclosure.
Figure 1B:
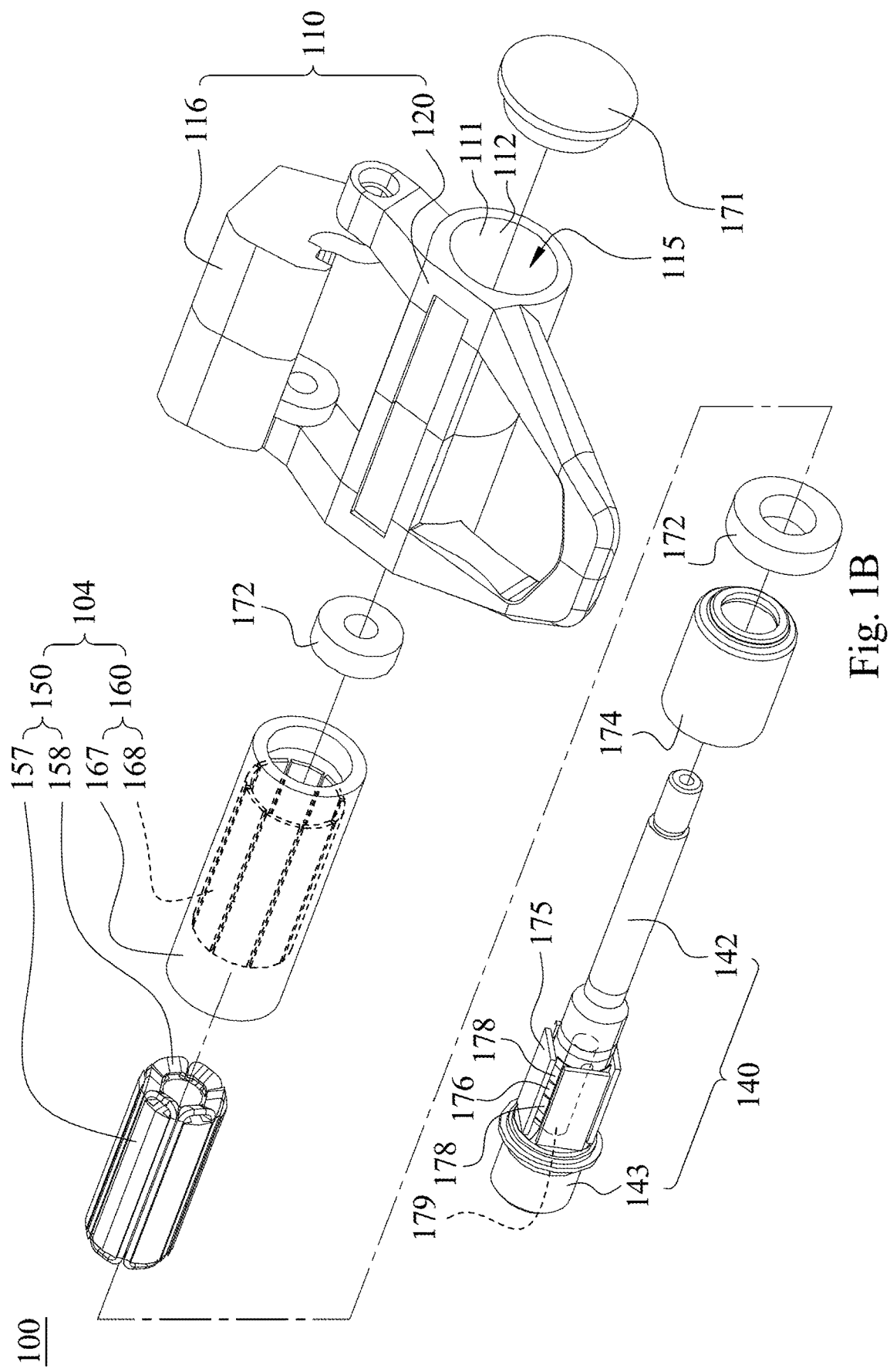
FIG. 1B is an exploded view of the self-powered apparatus according to FIG. 1A of the 1st embodiment.
Figure 1C:
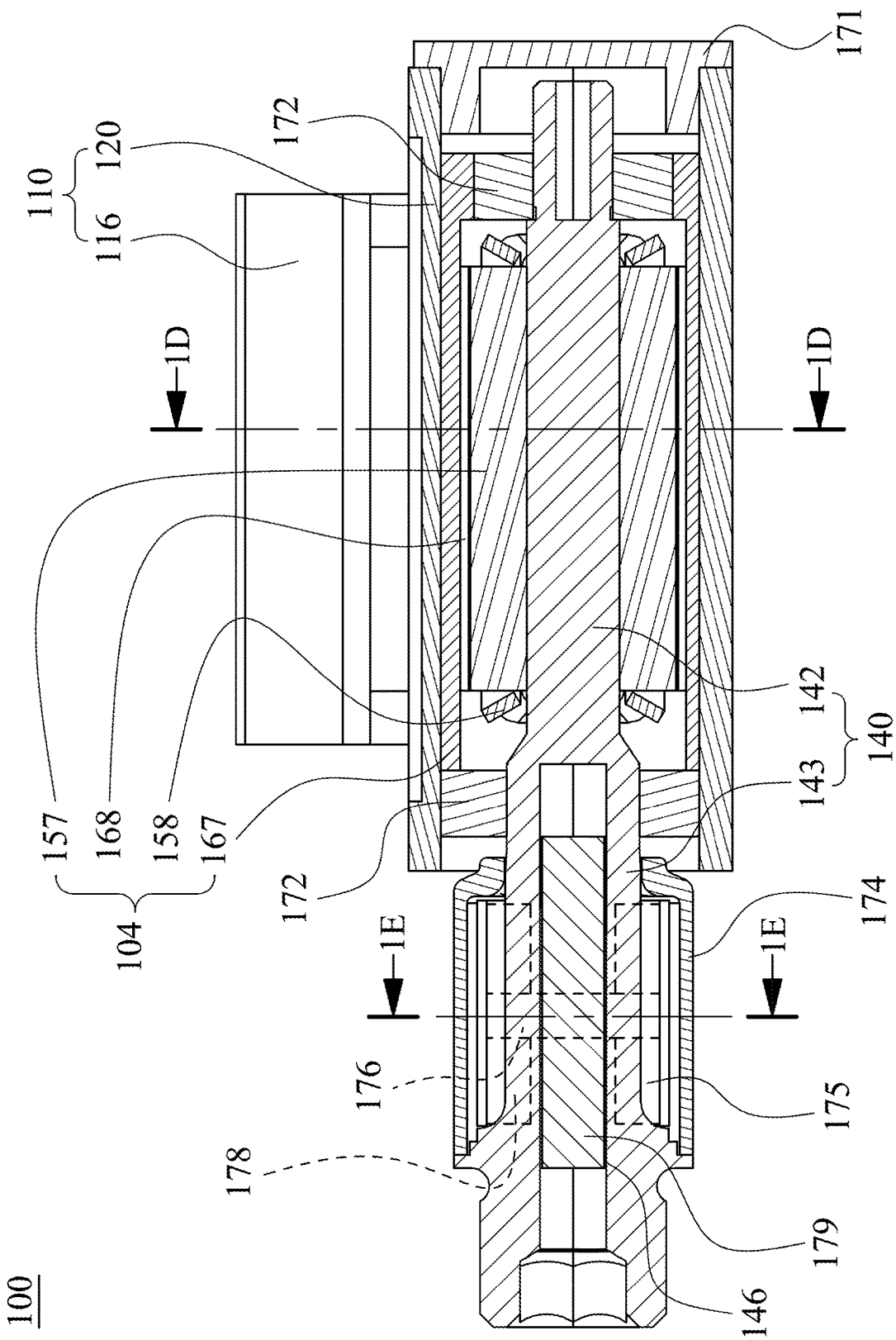
FIG. 1C is a longitudinally cross-sectional view of the self-powered apparatus according to FIG. 1A of the 1st embodiment.

FIG. 1A is a three-dimensional view of a self-powered apparatus 100 according to the 1st embodiment of the present disclosure. FIG. 1B is an exploded view of the self-powered apparatus 100 according to FIG. 1A of the 1st embodiment. FIG. 1C is a longitudinally cross-sectional view of the self-powered apparatus 100 according to FIG. 1A of the 1st embodiment. With reference to FIG. 1A to FIG. 1C, the self-powered apparatus 100 is an apparatus for cycling, e.g., a power pedal apparatus of a bicycle or an indoor exercise bike, especially, an apparatus can generate power while being pedaling to rotate. That is, the self-powered apparatus 100 is a pedaling and rotating apparatus for cycling. The self-powered apparatus 100 includes a pedal unit 110, a spindle 140, a generator 104 and an energy storage element 179 (e.g., battery). The pedal unit 110 includes an inner surface 111 to form and surround an accommodating space 115 therein, and it is can be also stated that the pedal unit 110 includes the accommodating space 115 to form the inner surface 111 therein. An opening of the pedal unit 110 may be closed by an end cap 171. The spindle 140 is accommodated in the accommodating space 115.

Figure 1D:
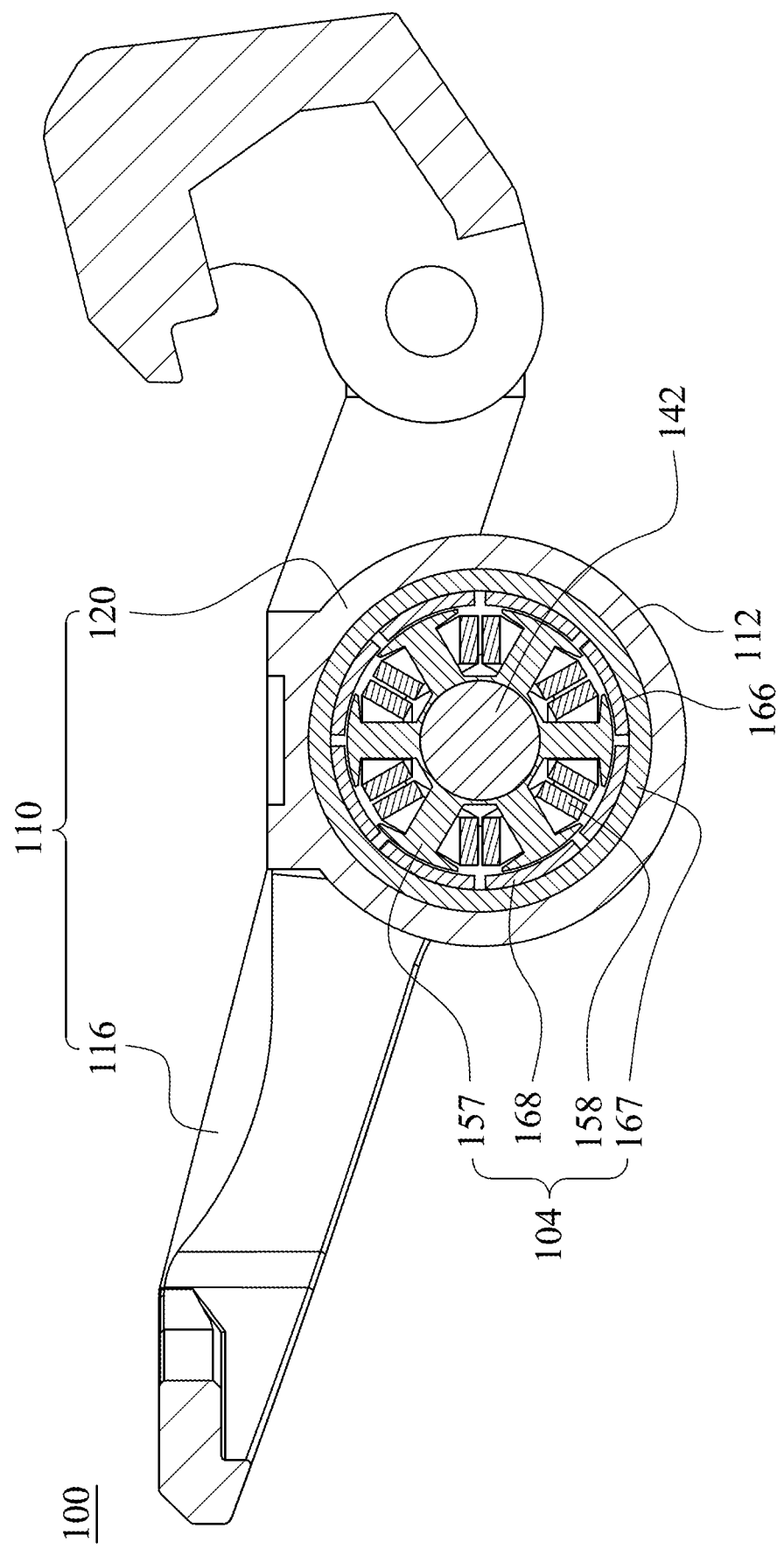
FIG. 1D is a cross-sectional view along line 1D-1D of FIG. 1C.

FIG. 1D is a cross-sectional view along line 1D-1D of FIG. 1C. FIG. 1E is a cross-sectional view along line 1E-1E of FIG. 1C. With reference to FIG. 1B to FIG. 1E, the generator 104 includes at least a stator 150 and a rotor 160. The stator 150 is disposed on the spindle 140, the rotor 160 is disposed on a body inner surface 112 of the pedal unit 110, and the rotor 160 surrounds the stator 150 correspondingly and is non-contact (i.e., in non-contact) with the stator 150, wherein the body inner surface 112 is a portion of the inner surface 111 for receiving and equipping the rotor 160. The energy storage element 179 is electrically coupled to the generator 104. When the pedal unit 110 is being pedaled to rotate by the rider, the stator 150 is fixed on the spindle 140, the rotor 160 rotates relatively to the stator 150 and along with the pedal unit 110 (i.e., the rotor 160 rotates along with the pedal unit 110 and rotates relatively to the stator 150), and a power is generated by the generator 104 to charge the energy storage element 179. Therefore, "a self-powered apparatus (e.g., a power pedal apparatus of a bicycle or an indoor exercise bike) with active energy (power) supply including a power generation device for energy harvesting (i.e., a power generator)" proposed in the present disclosure aims to extend usage time of the power supply for the self-powered apparatus. The technical manner is to arrange a "micro-generator" inside the limited space of the pedal body or a pedal base cover described in later embodiments. The natural or intrinsic movement state of the power pedal apparatus driven by the rider's pedaling drives the generator to generate electricity while the power pedal apparatus is at a rotating status, and to charge the battery of the power pedal apparatus, so as to extend the usage time of the battery or the power supply.

In detail, the pedal unit 110 may further include a pedal body 120 and at least one pedal plate 116. Specifically, a number of the at least one pedal plate 116 is two, the two pedal plates 116 are connected to the pedal body 120 to be extended along two ends, respectively, of a vertical direction of the spindle 140, and the two pedal plates 116 are chosen from a clipless type as an exemplary example. The pedal body 120 is substantially tubular-shaped (i.e., the accommodating space 115 formed therein is substantially columnar-shaped, cylinder-shaped or tubular-shaped). The inner surface 111 includes a body inner surface 112 located within and on the pedal body 120, and the spindle 140 includes a body portion 142 located correspondingly to and inside the body inner surface 112. The stator 150 of the generator 104 is disposed on the body portion 142 of the spindle 140, and the rotor 160 thereof is disposed on the body inner surface 112 of the pedal unit 110. Therefore, the generator 104 is advantageous in employing the intrinsic rotating property of the self-powered apparatus 100 to save and harvest more power while neither increasing the overall volume nor changing the outer shape of the self-powered apparatus 100.

The self-powered apparatus 100 may further include at least one sensor 178 (e.g., eight sensors 178 or four sensor groups) being power-supplied by the energy storage element 179. The spindle 140 includes the body portion 142 and a base portion 143. The body portion 142 is disposed closer to the two pedal plates 116 of the pedal unit 110 than the base portion 143 thereto. When a bicycle includes the self-powered apparatus 100 as a power pedal apparatus thereof, the body portion 142 is located between two bearings 172, and the base portion 143 is located adjacent to a crank arm of the bicycle. The energy storage element 179 and the sensors 178 are disposed adjacent to the base portion 143. Therefore, the components configuration and circuitry layout of the self-powered apparatus 100 are beneficial to effectively generate electricity without affecting the original pedaling property.

Figure 1F:
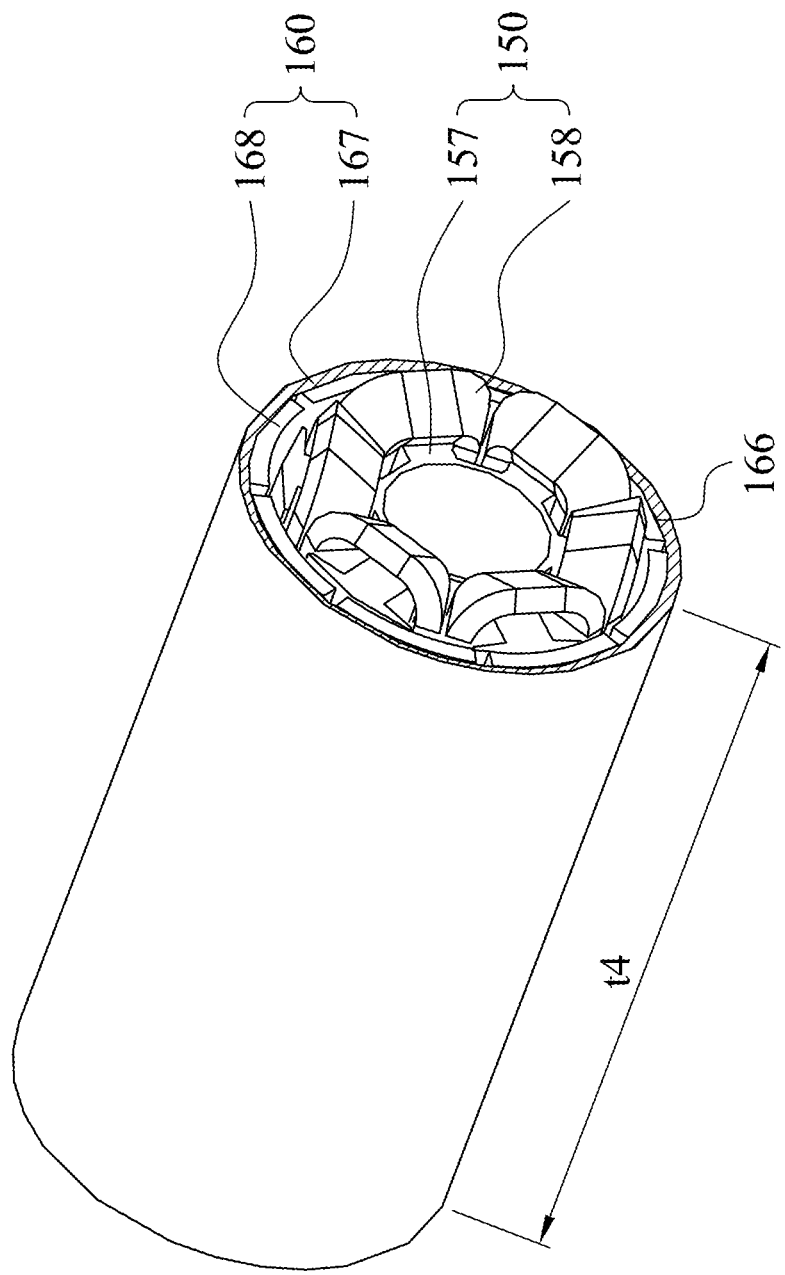
FIG. 1F is a three-dimensional view of a generator of the self-powered apparatus according to the 1st embodiment.
Figure 1G:
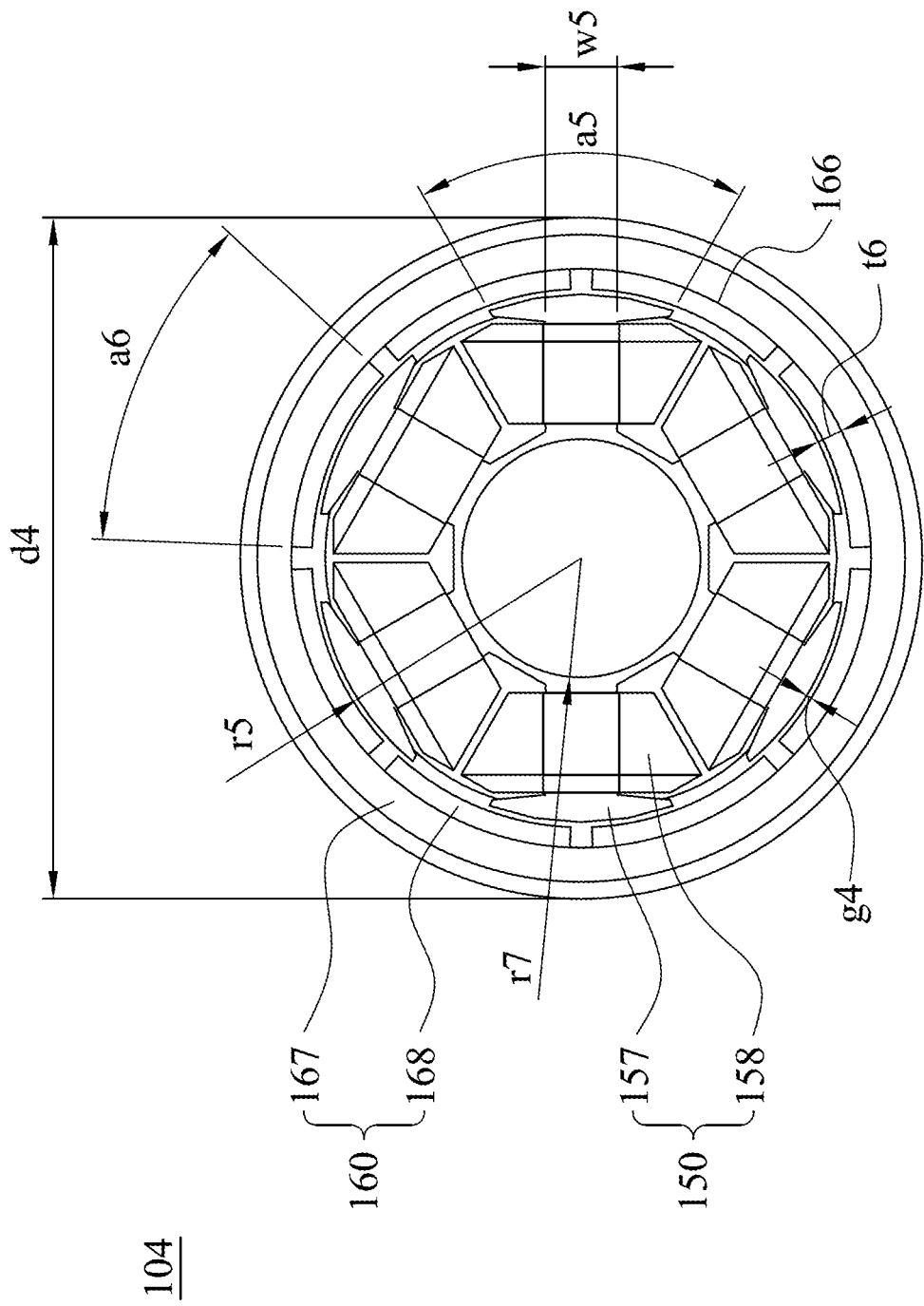
FIG. 1G is a schematic view of parameters of the generator of the self-powered apparatus according to FIG. 1D of the 1st embodiment.

FIG. 1F is a three-dimensional view of the generator 104 of the self-powered apparatus 100 according to the 1st embodiment. FIG. 1G is a schematic view of parameters of the generator 104 of the self-powered apparatus 100 according to FIG. 1D of the 1st embodiment. With reference to FIG. 1F and FIG. 1G, the stator 150 of the generator 104 may include a plurality of stator teeth 157 and a plurality of stator coils 158, which are wound around the stator teeth 157, respectively. The rotor 160 of the generator 104 may include a rotor yoke (i.e., a retaining ring) 167 and a plurality of rotor magnets 168, which are attached in order along a yoke inner surface 166 of the rotor yoke 167 being tubular-shaped. An arc length a5 of each of the stator teeth 157 is smaller than or equal to (smaller than, specifically) an arc length a6 of each of the rotor magnets 168, as shown in FIG. 1G. Therefore, the electric power can be effectively induced and generated by the generator 104 due to the change of the magnetic field. In detail, because the magnetic field from each of the rotor magnets 168 would not be interrupted while the rotor 160 rotating relatively to the stator 150, the micro generator 104 disposed within the limited volume can get more excitation to directly increase the total generated power.

In the 1st embodiment according to the present disclosure, a number of the stator teeth 157 may be in a range of 3 to 12 or in a range of 4 to 8. A number of the rotor magnets 168 may be in a range of 2 to 16 or in a range of 6 to 10. An outer diameter d4 of the generator 104 may be in a range of 10 mm to 30 mm or in a range of 17 mm to 23 mm. A thickness t4 of the generator 104 may be in a range of 20 mm to 60 mm or in a range of 28 mm to 36 mm. An air gap g4 between the stator 150 and the rotor 160 may be in a range of 0.10 mm to 0.30 mm or in a range of 0.12 mm to 0.18 mm. A winding number of each of the stator coils 158 may be in a range of 250 turns to 500 turns or in a range of 330 turns to 360 turns. Therefore, one of the key problems being overcome by the present disclosure is that it is difficult to design a suitable generator 104 in a limited space to generate sufficient electric power for charging the energy storage element 179, while the power generated by the micro generator 104 is usually proportional to the size or volume of the generator 104 itself. The various parameters of the generator 104, e.g., a number of pole pair, winding turn, thickness, length, etc., should be well designed to optimize and achieve the sufficient induced voltage levels for the successful charging, so as to prevent the generator 104 from becoming a power consumption load to consume power as the generated power is insufficient.

Specifically, with reference to FIG. 1F and FIG. 1G, the generator 104 formed with AC three-phase structures is disposed on the pedal body 120 corresponding to the body portion 142 of the spindle 140 and includes six slots and eight poles as an exemplary example. The stator 150 has six teeth, and the rotor 160 has eight poles. The winding number of each of the stator coils 158 is 345 turns. A magnet material of each of the rotor magnets 168 is rubidium iron boron (NdFeB) and a magnetic grade thereof is N42. Other magnet material with suitable magnetic grade is also available. Generally speaking, the stronger magnetic strength corresponding to the magnetic grade of the magnet material is, the higher efficiency of the generated power of the generator 104 will be achieved. The arc length of each of the stator teeth 157 is a5, the arc length of each of the rotor magnets 168 is a6, the outer diameter of the generator 104 is d4, the thickness of the generator 104 is t4, a thickness of each of the rotor magnets 168 is t6, the air gap between the stator 150 and the rotor 160 is g4, a width of each of the stator teeth 157 is w5, an outer radius of the stator 150 is r5, an inner radius of the stator 150 (i.e., a radius of the body portion 142 of the spindle 140) is r7, and the values of the aforementioned parameters shown in FIG. 1F and FIG. 1G of the 1st embodiment are listed in the following Table 1.

TABLE 1

| a5 (mm) | 5.15 | g4 (mm) | 0.15 |
|---|---|---|---|
| a6 (mm) | 6.15 | w5 (mm) | 2.10 |
| d4 (mm) | 20.00 | r5 (mm) | 7.75 |
| t4 (mm) | 32.00 | r7 (mm) | 3.50 |
| t6 (mm) | 0.80 | | |

Figure 1H:
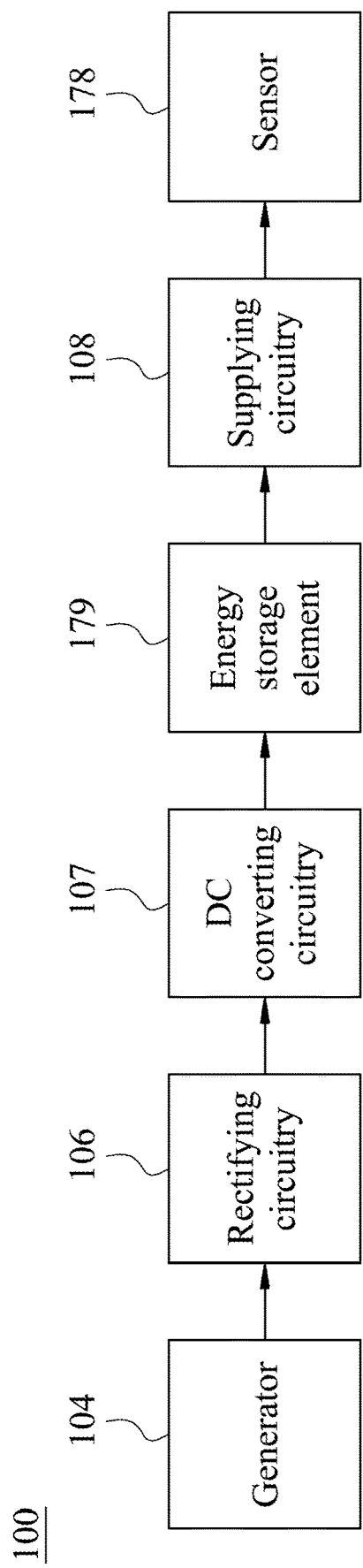
FIG. 1H is a block diagram of the self-powered apparatus according to the 1st embodiment.

FIG. 1H is a block diagram of the self-powered apparatus 100 according to the 1st embodiment. With reference to FIG. 1B, FIG. 1C, FIG. 1E and FIG. 1H, the self-powered apparatus 100 may further include at least one circuit board (circuit boards 175, 176, specifically) disposed around the base portion 143. The circuit boards 175, 176 are electrically coupled to support a rectifying circuitry 106, a DC (Direct Current) converting circuitry 107 for the energy storage element 179 and a supplying circuitry (i.e., power supplying circuitry) 108 for the sensors 178. The energy storage element 179 is disposed inside a spindle accommodating space surrounded by a spindle inner surface 146 of the base portion 143, and it is can be also stated that the base portion 143 of the spindle 140 includes the spindle accommodating space to form the spindle inner surface 146 therein. Owing to the generated power can be used to charge the energy storage element 179, it is advantageous in preventing from frequently removing the battery of the power pedal apparatus to charge, and thereby improving the usage time of the power supply and battery charging conveniences thereof. Specifically, the rectifying circuitry 106 includes a rectifier or regulator to rectify or regulate the induced back EMF (Electromotive Force) voltages generated by the 3-phase AC (Alternating Current) generator 104, the DC converting circuitry 107 including a DC-DC converter is utilized to buck or boost the rectified voltages to the DC converting voltages with the proper voltage levels, and then the energy storage element 179 with its BMS (Battery Management System) is utilized to store and manage the storage capacity of the energy storage element 179 for power-supplying the sensors 178. In addition, the wires electrically connected among the generator 104, the circuit boards 175, 176, the energy storage element 179 and the sensors 178 are omitted in the drawings. There may be an external charging interface, e.g., USB ports, electrically coupled to the energy storage element 179 for externally charging the energy storage element 179, as a charging option.

In the 1st embodiment, all the circuit boards 175, 176 and the sensors 178 are disposed adjacent to the base portion 143 and covered by a spindle cover 174, which is not connected to the pedal unit 110, wherein the spindle cover 174 may be fixed around the base portion 143 and does not rotate with the pedal unit 110. As an exemplary example but not limited to, the circuit board 175 is a PCB (i.e., Printed Circuit Board). A number of the circuit board 175 is four, and the four circuit boards 175 are regularly and symmetrically arranged around the base portion 143 of the spindle 140. The circuit board 176 is an annular-shaped FPCB (i.e., Flexible PCB or Flexible Printed Circuit) to surround and to be attached on the base portion 143, and a number of the circuit board 176 is one. In another embodiment according to the present disclosure, there may be at least one PCB and at least one FPCB connected together to form an annular-shaped circuit carrier to surround a base portion of a spindle.

Each of the sensors 178 may be a strain gauge for measuring cycling power of the rider during pedaling. As an exemplary example but not limited to, a number of the sensors 178 is at least two and specifically eight, each two of the sensors 178 forms a sensor group, as shown in FIG. 1B and FIG. 1C, and thereby a number of the sensor groups is four. A number of the circuit boards 175 is at least two and specifically four. The four sensor groups and the four circuit boards 175 are alternately and symmetrically arranged around the base portion 143 of the spindle 140, as shown in FIG. 1E. Therefore, the self-powered apparatus 100 is advantageous in rotating smoothly while the generator 104 being included in the self-powered apparatus 100.

Figure 1I:
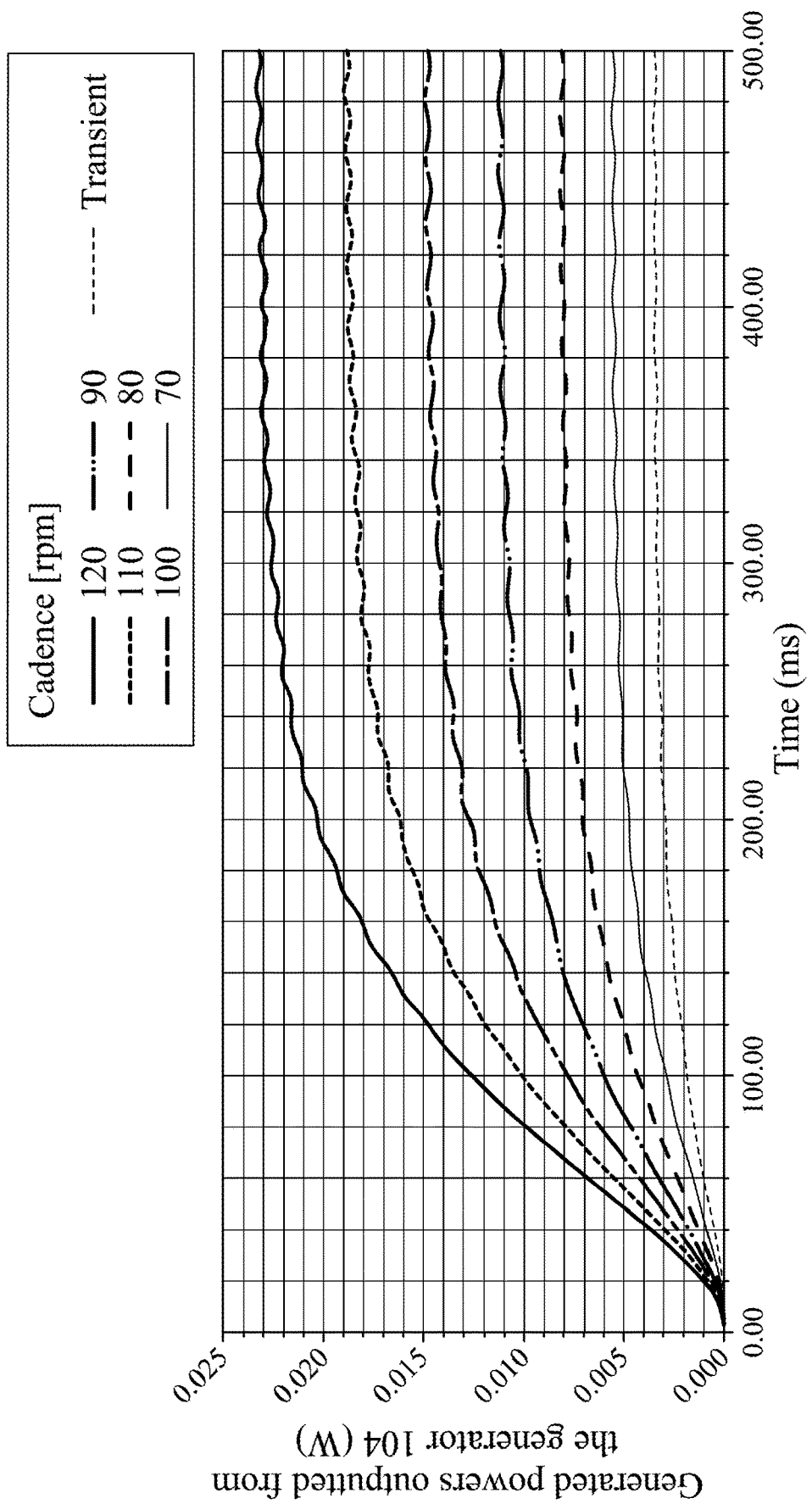
FIG. 1I is a schematic view of a generated power outputted from the generator of the self-powered apparatus corresponding to different pedaling cadence speeds according to the 1st embodiment.
Figure 1J:
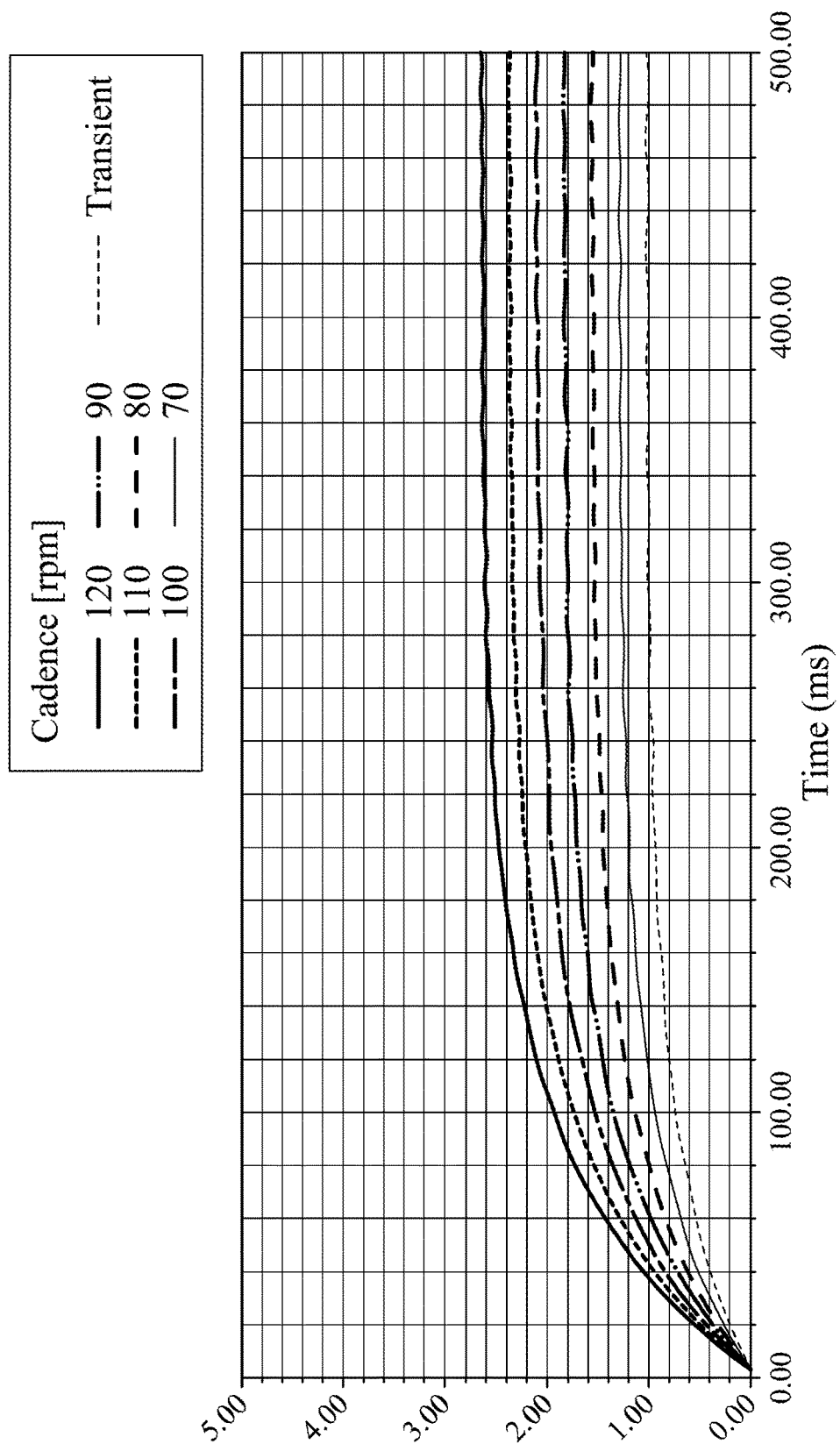
FIG. 1J is a schematic view of a rectified voltage outputted from a rectifying circuitry of the self-powered apparatus corresponding to different pedaling cadence speeds according to the 1st embodiment.

FIG. 1I is a schematic view of the generated power outputted from the generator 104 of the self-powered apparatus 100 corresponding to different pedaling cadence speeds according to the 1st embodiment. FIG. 1J is a schematic view of the rectified voltage outputted from the rectifying circuitry 106 of the self-powered apparatus 100 corresponding to different pedaling cadence speeds according to the 1st embodiment. With reference to FIG. 1H to FIG. 1J, a properly pedaling cadence speed of the rotor 160 may be in a range of 60 rpm to 120 rpm, and the cadence speed being smaller than or equal to 60 rpm is approximately corresponding to the status of transient. The generated power outputted from the generator 104 may be around in a range of 3.4 mW to 34.5 mW or in a range of 3.4 mW to 23.1 mW. In detail, when the pedaling cadence speed of the rotor 160 is in a range of 60 rpm to 80 rpm, the generated power outputted from the generator 104 may be around in a range of 3.4 mW to 8.1 mW; when the pedaling cadence speed of the rotor 160 is in a range of 80 rpm to 100 rpm, the generated power outputted from the generator 104 may be around in a range of 8.1 mW to 14.7 mW; when the pedaling cadence speed of the rotor 160 is in a range of 100 rpm to 120 rpm, the generated power outputted from the generator 104 may be around in a range of 14.7 mW to 23.1 mW. The rectifying circuitry 106 may be configured between the generator 104 and the energy storage element 179, and the rectified voltage outputted from the rectifying circuitry 106 may be around in a range of 0.5 VDC to 9 VDC, in a range of 0.9 VDC to 2.8 VDC, or in a range of 1.01 VDC to 2.6 VDC depending upon the various parameters designed for the generator 104. The DC converted voltage outputted from the DC converting circuitry 107 may be in a range of 4.15 VDC to 4.2 VDC. Therefore, the generator 104 designed in the limited space in the self-powered apparatus 100 is beneficial to generate enough power and proper voltage to effectively charge the energy storage element 179 and then supply the sensors 178 disposed therein.

In the 1st embodiment, the relationships between the pedaling cadence (frequency) speeds of a transient state, 70, 80, 90, 100, 110 and 120 (rpm) and the generated powers outputted from the generator 104 may be shown in FIG. 1I. Average generated powers of all the curves in FIG. 1I corresponding to the pedaling cadence speeds, respectively, are shown in the following Table 2, and the average generated powers shown therein are calculated from 400 ms to 500 ms of a steady state. It shows that a specifically generated power is about 5.5 mW at the pedaling cadence speed of 70 rpm in FIG. 1I and Table 2. The relationships between the pedaling cadence speeds of the transient state, 70, 80, 90, 100, 110 and 120 (rpm) and the rectified voltages outputted from the rectifying circuitry 106 may be shown in FIG. 1J. Average rectified voltages of all the curves in FIG. 1J corresponding to the pedaling cadence speeds, respectively, are shown in the following Table 3, and the average rectified voltages shown therein are calculated from 400 ms to 500 ms of the steady state. Generally speaking, the higher the pedaling cadence speed is, the higher efficiency of the generated power of the generator 104 will be achieved. However, the pedaling cadence speed of the users or riders always has limitations. There are many parameters of the generator 104 should be well designed to achieve sufficient induced voltage levels to generate sufficient charging power without any speed-adjusting mechanism in the present disclosure. After the induced back EMF generated from the generator 104 is rectified by the rectifying circuitry 106, boosted and stabilized by the DC converting circuitry 107, the DC converted voltage with the proper voltage level can be outputted from the DC converting circuitry 107 and inputted to the energy storage element 179, and the energy storage element 179 can be charged accordingly.

When the pedaling cadence speed of the rotor 160 is in the range of 60 rpm to 120 rpm, the generated power outputted from the generator 104 may increase at least 20% while the pedaling cadence speed increasing 10 rpm. As an exemplary example but not limited to, the generated power outputted from the generator 104 may increase 47.27% while the pedaling cadence speed of 70 rpm increasing to 80 rpm, i.e., while the pedaling cadence speed increasing or being added by 10 rpm from 70 rpm. In detail, as shown in Table 2, the generated power is 5.5 mW at the pedaling cadence speed of 70 rpm, the generated power is 8.1 mW at the pedaling cadence speed of 80 rpm, and thereby the generated power outputted from the generator 104 increases 47.27% (calculated according to (8.1-5.5)/5.5100%) while the pedaling cadence speed increasing 10 rpm (calculated according to 80 rpm minus 70 rpm) from 70 rpm.

TABLE 2

| Cadence (rpm) | Transient | 70 | 80 | 90 | 100 | 110 | 120 |
|---|---|---|---|---|---|---|---|
| Avg. Power (W) | 0.0034 | 0.0055 | 0.0081 | 0.0111 | 0.0147 | 0.0187 | 0.0231 |

TABLE 3

| Cadence (rpm) | Transient | 70 | 80 | 90 | 100 | 110 | 120 |
|---|---|---|---|---|---|---|---|
| Avg. Voltage (V) | 1.0166 | 1.2878 | 1.5597 | 1.8297 | 2.1052 | 2.3738 | 2.6397 |

The self-powered apparatus 100 may exclude both a speed-increasing mechanism and a speed-decelerating mechanism. That is, there is no need to configure the speed-increasing or decelerating mechanisms, e.g., a sun gear, a plurality of planetary gears, etc., in the limited space of the self-powered apparatus 100 of the present disclosure. Therefore, it is advantageous in keeping the weight, the downsized volume and saving the cost of the self-powered apparatus 100.

Figure 2A:
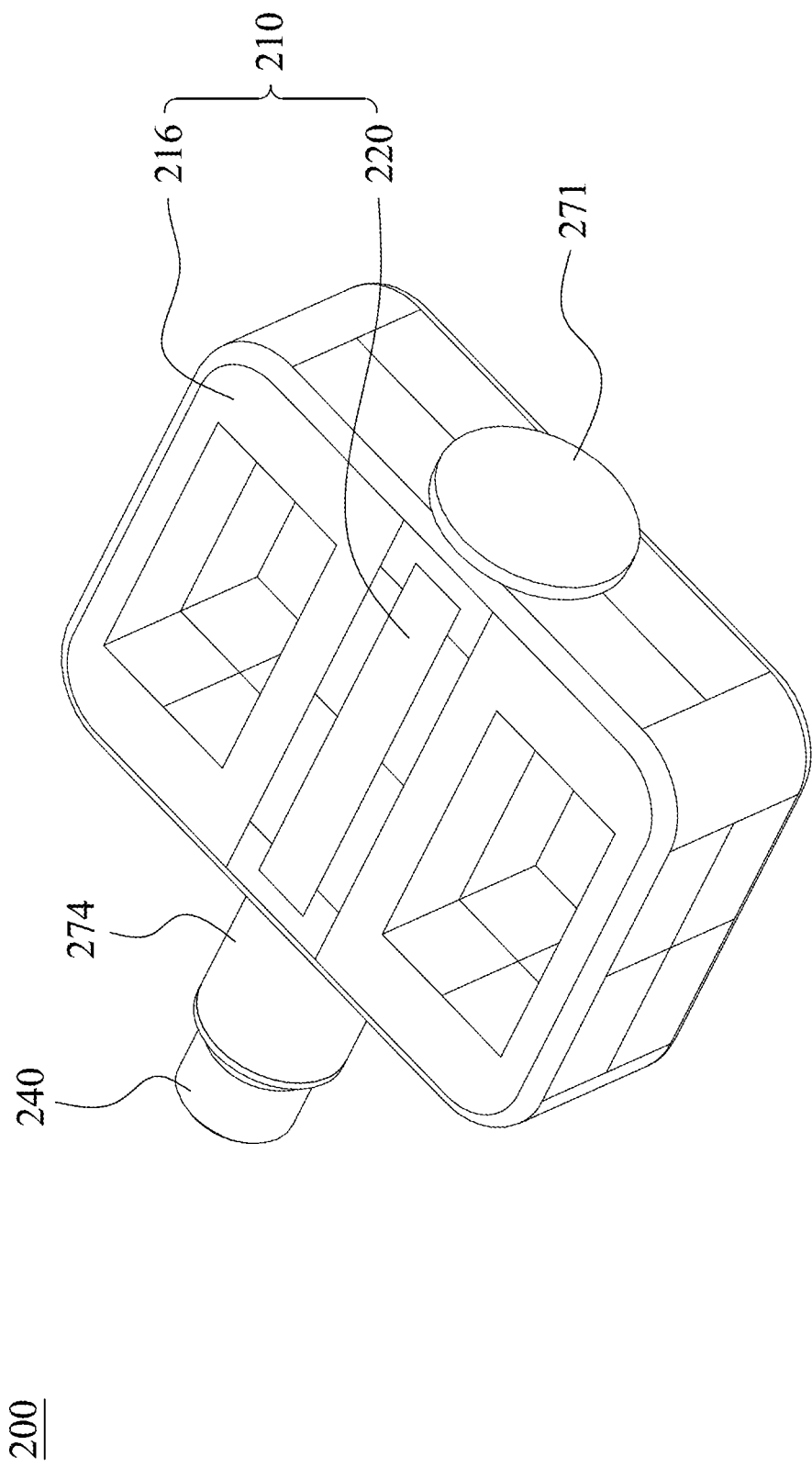
FIG. 2A is a three-dimensional view of a self-powered apparatus according to the 2nd embodiment of the present disclosure.
Figure 2B:
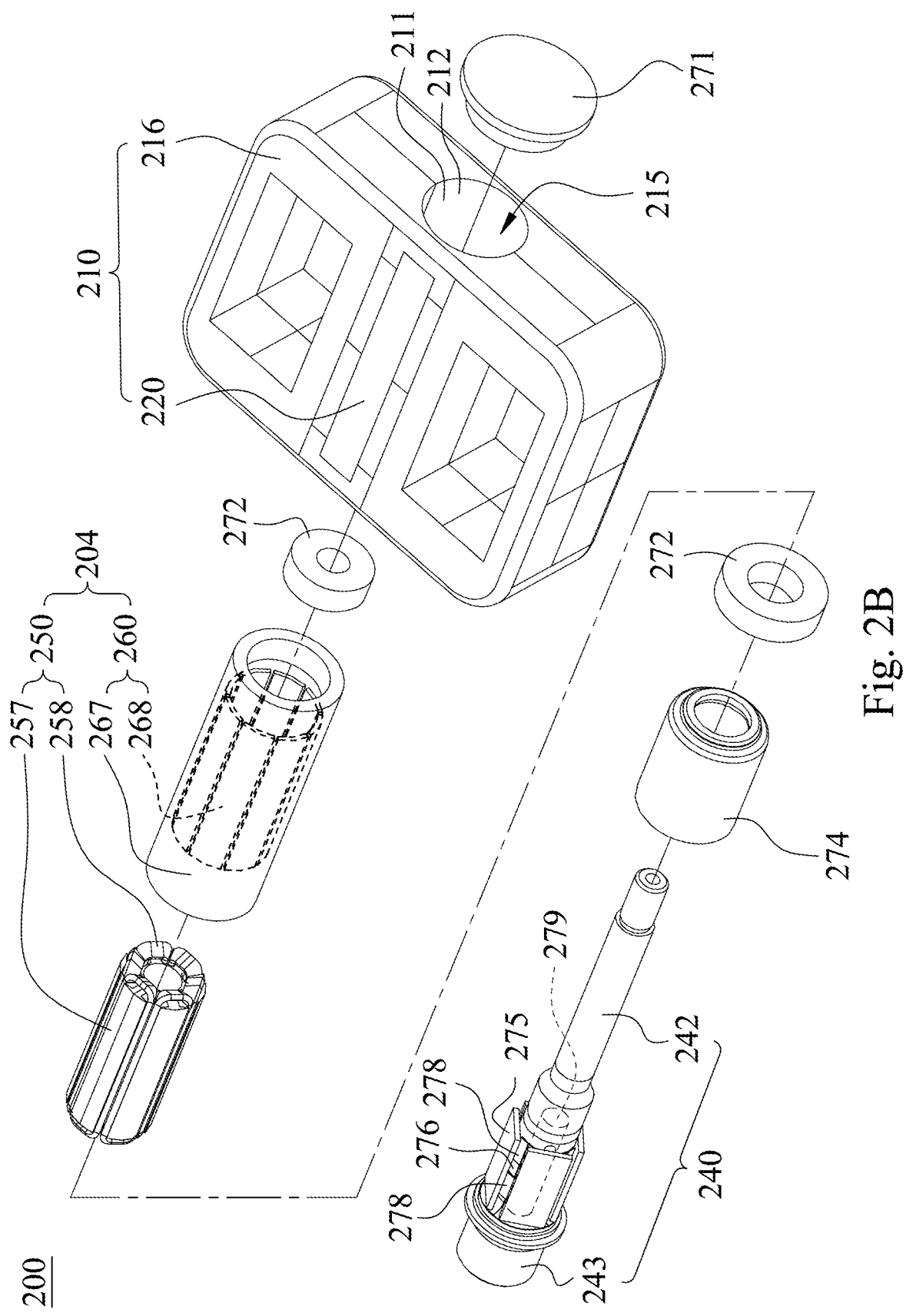
FIG. 2B is an exploded view of the self-powered apparatus according to FIG. 2A of the 2nd embodiment.
Figure 2C:
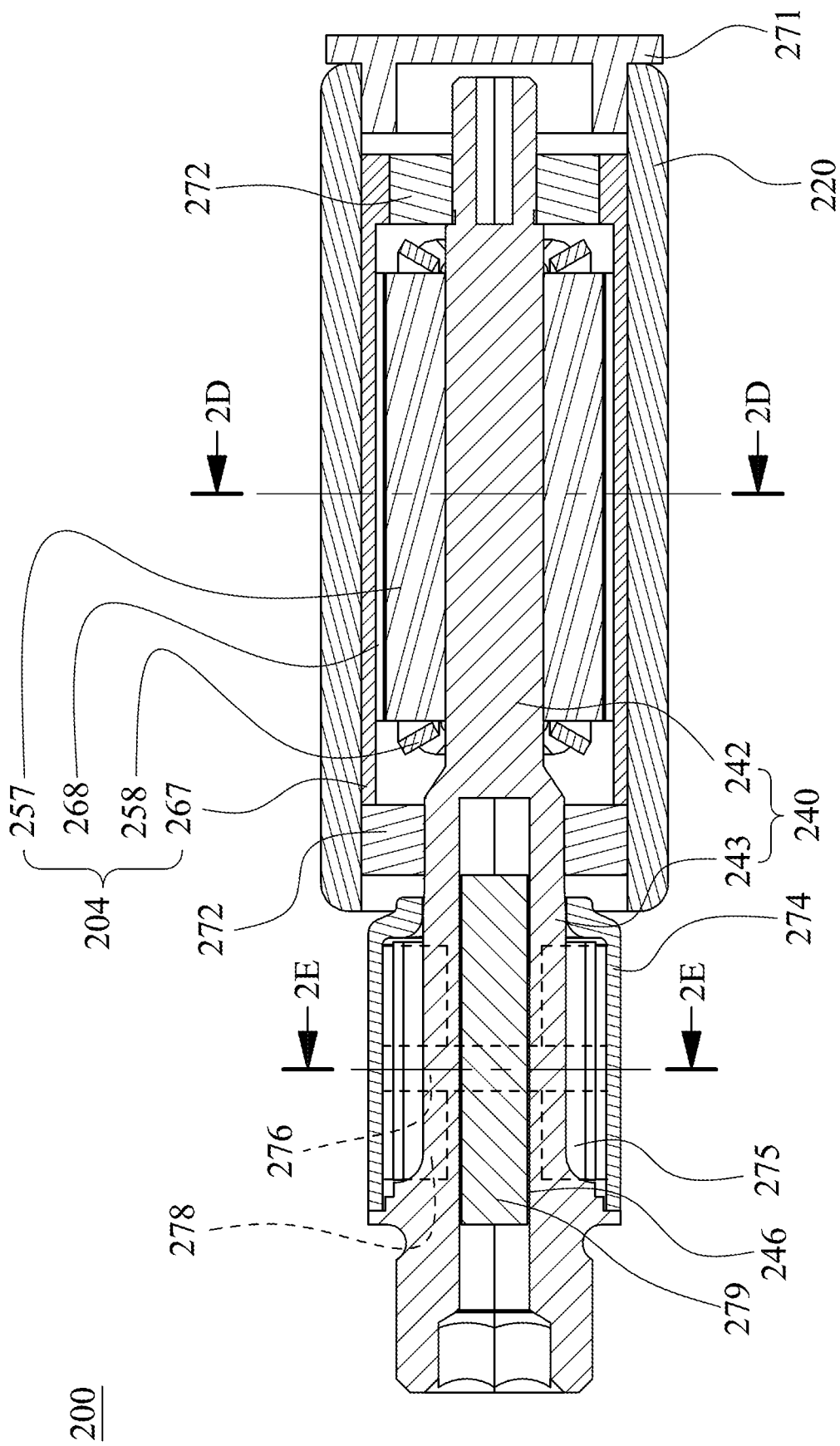
FIG. 2C is a longitudinally cross-sectional view of the self-powered apparatus according to FIG. 2A of the 2nd embodiment.

FIG. 2A is a three-dimensional view of a self-powered apparatus 200 according to the 2nd embodiment of the present disclosure. FIG. 2B is an exploded view of the self-powered apparatus 200 according to FIG. 2A of the 2nd embodiment. FIG. 2C is a longitudinally cross-sectional view of the self-powered apparatus 200 according to FIG. 2A of the 2nd embodiment. With reference to FIG. 2A to FIG. 2C, the self-powered apparatus 200 is an apparatus for cycling, e.g., a power pedal apparatus of a bicycle or an indoor exercise bike, especially, an apparatus can generate power while being pedaling to rotate. That is, the self-powered apparatus 200 is a pedaling and rotating apparatus for cycling. The self-powered apparatus 200 includes a pedal unit 210, a spindle 240, a generator 204 and an energy storage element 279. The pedal unit 210 includes an inner surface 211 to form and surround an accommodating space 215 therein, and it is can be also stated that the pedal unit 210 includes the accommodating space 215 to form the inner surface 211 therein. An opening of the pedal unit 210 is closed by an end cap 271. The spindle 240 is accommodated in the accommodating space 215.

Figure 2D:
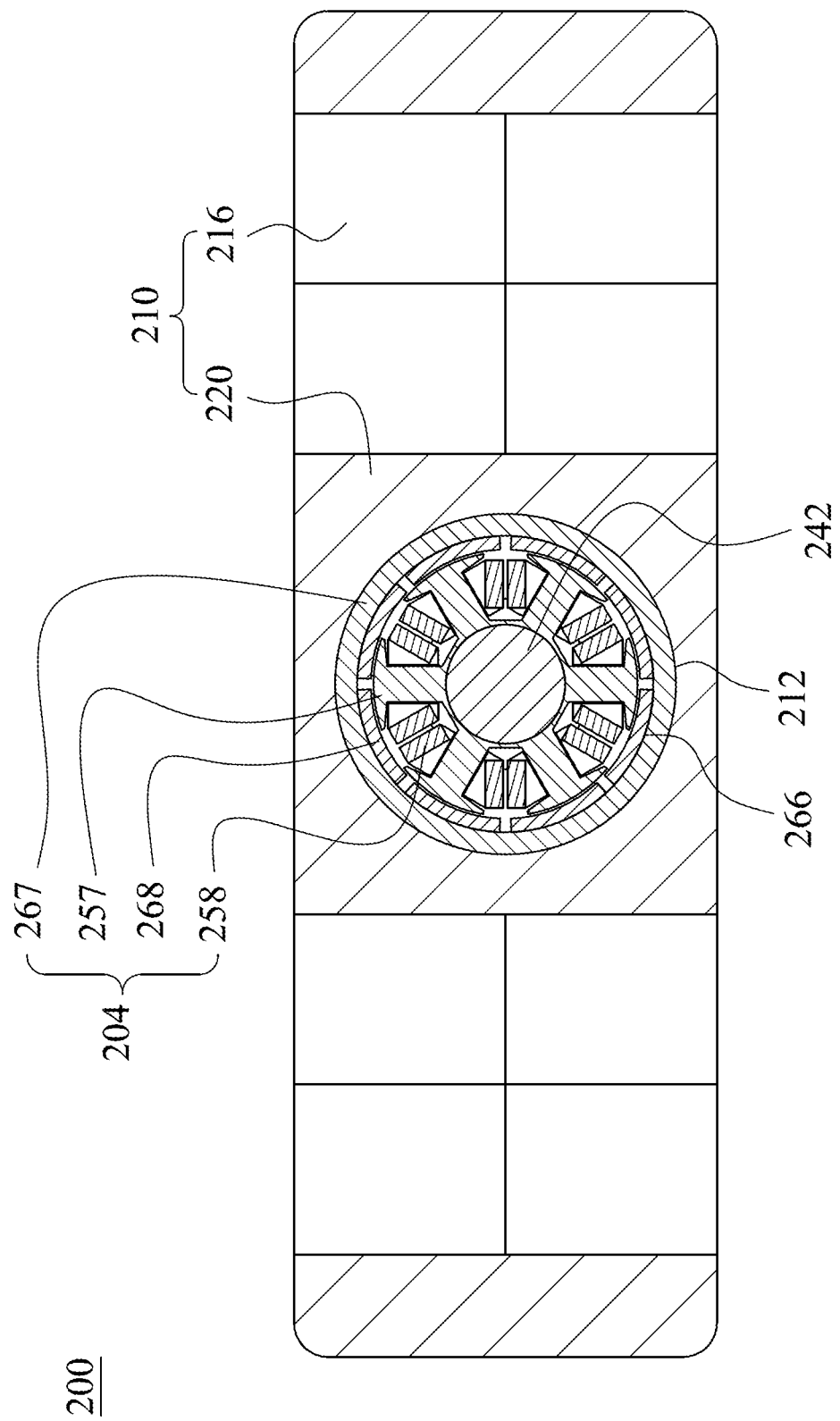
FIG. 2D is a cross-sectional view along line 2D-2D of FIG. 2C.
Figure 2E:
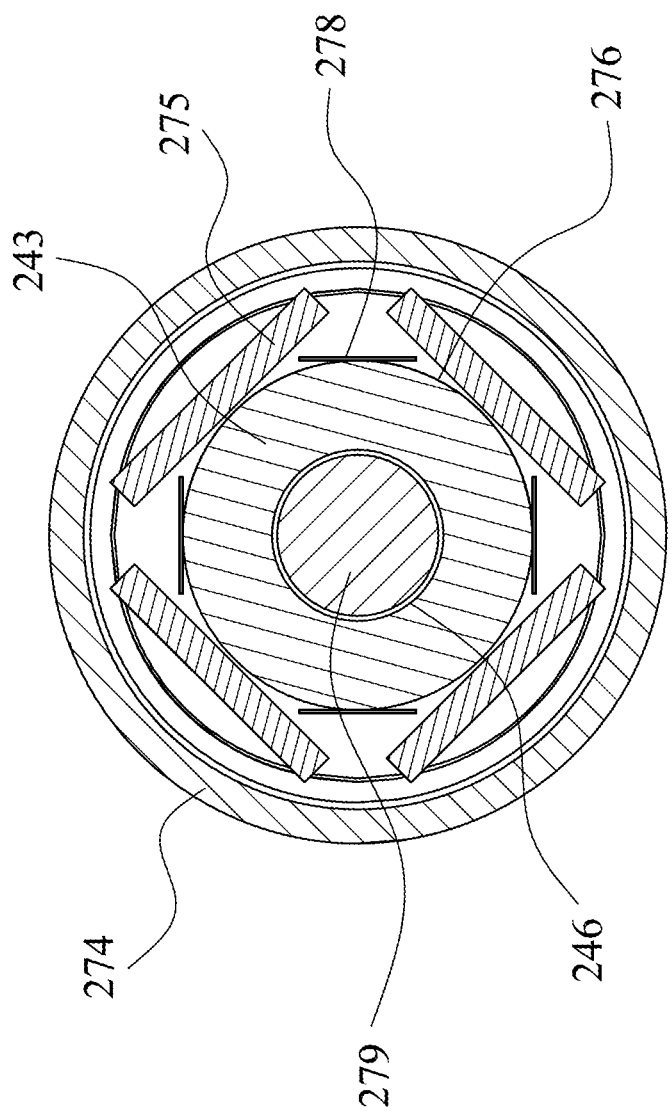
FIG. 2E is a cross-sectional view along line 2E-2E of FIG. 2C.

FIG. 2D is a cross-sectional view along line 2D-2D of FIG. 2C. FIG. 2E is a cross-sectional view along line 2E-2E of FIG. 2C. With reference to FIG. 2B to FIG. 2E, the generator 204 includes at least a stator 250 and a rotor 260. The stator 250 is disposed on the spindle 240, the rotor 260 is disposed on a body inner surface 212 of the pedal unit 210, and the rotor 260 surrounds the stator 250 correspondingly and is non-contact with the stator 250, wherein the body inner surface 212 is a portion of the inner surface 211 for receiving and equipping the rotor 260. The energy storage element 279 is electrically coupled to the generator 204. When the pedal unit 210 is being pedaled to rotate by the rider, the stator 250 is fixed on the spindle 240, the rotor 260 rotates relatively to the stator 250 and along with the pedal unit 210, and a power is generated by the generator 204 to charge the energy storage element 279.

In detail, the pedal unit 210 further includes a pedal body 220 and two pedal plates 216, which are connected to the pedal body 220 to be extended along two ends, respectively, of a vertical direction of the spindle 240, and the two pedal plates 216 are chosen from a flat type as an exemplary example. The pedal body 220 is substantially tubular-shaped. The inner surface 211 includes a body inner surface 212 located within and on the pedal body 220, and the spindle 240 includes a body portion 242 located correspondingly to and inside the body inner surface 212. The stator 250 of the generator 204 is disposed on the body portion 242 of the spindle 240, and the rotor 260 thereof is disposed on the body inner surface 212 of the pedal unit 210.

As an exemplary example but not limited to, the self-powered apparatus 200 further includes eight sensors 278 being strain gauges and power-supplied by the energy storage element 279. The spindle 240 includes the body portion 242 and a base portion 243. The body portion 242 is disposed closer to the two pedal plates 216 of the pedal unit 210 than the base portion 243 thereto. When a bicycle includes the self-powered apparatus 200 as a power pedal apparatus thereof, the body portion 242 is located between two bearings 272, and the base portion 243 is located adjacent to a crank arm of the bicycle. The energy storage element 279 and the sensors 278 are disposed adjacent to the base portion 243.

With reference to FIG. 2B and FIG. 2D, the stator 250 of the generator 204 includes six stator teeth 257 and six stator coils 258, which are wound around the six stator teeth 257, respectively. The rotor 260 of the generator 204 includes a rotor yoke 267 and eight rotor magnets 268, which are attached in order along a yoke inner surface 266 of the rotor yoke 267 being tubular-shaped. An arc length of each of the stator teeth 257 is smaller than an arc length of each of the rotor magnets 268, as shown in FIG. 2D.

Specifically, the generator 204 formed with AC three-phase structures is disposed on the pedal body 220 corresponding to the body portion 242 of the spindle 240 and includes six slots and eight poles. The stator 250 has six teeth, and the rotor 260 has eight poles.

As an exemplary example but not limited to, with reference to FIG. 2B, FIG. 2C and FIG. 2E, the self-powered apparatus 200 further includes four circuit boards 275 and a circuit board 276 disposed around the base portion 243 of the spindle 240. Each of the four circuit boards 275 is a PCB, and the four circuit boards 275 are regularly and symmetrically arranged around the base portion 243. The circuit board 276 is an annular-shaped FPCB to surround and to be attached on the base portion 243. All the circuit boards 275, 276 and the sensors 278 are disposed adjacent to the base portion 243 and covered by a spindle cover 274, which is not connected to the pedal unit 210. A number of the sensors 278 is at least two and specifically eight, each two of the sensors 278 forms a sensor group, as shown in FIG. 2B and FIG. 2C, and thereby a number of the sensor groups is four. A number of the circuit boards 275 is at least two and specifically four. The four sensor groups and the four circuit boards 275 are alternately and symmetrically arranged around the base portion 243 of the spindle 240, as shown in FIG. 2E. The energy storage element 279 is disposed in a spindle accommodating space surrounded by a spindle inner surface 246 of the base portion 243. The circuit boards 275, 276 are electrically coupled to support a rectifying circuitry, a DC converting circuitry for the energy storage element 279 and a supplying circuitry for the sensors 278. The wires electrically connected among the generator 204, the circuit boards 275, 276, the energy storage element 279 and the sensors 278 are omitted in the drawings. Further, the self-powered apparatus 200 excludes or lacks both a speed-increasing mechanism and a speed-decelerating mechanism.

Regarding to the self-powered apparatus 200 according to the 2nd embodiment, the details and the values of the parameters stated in the self-powered apparatus 100 according to the 1st embodiment may be referred therefor and not described again.

Figure 3A:
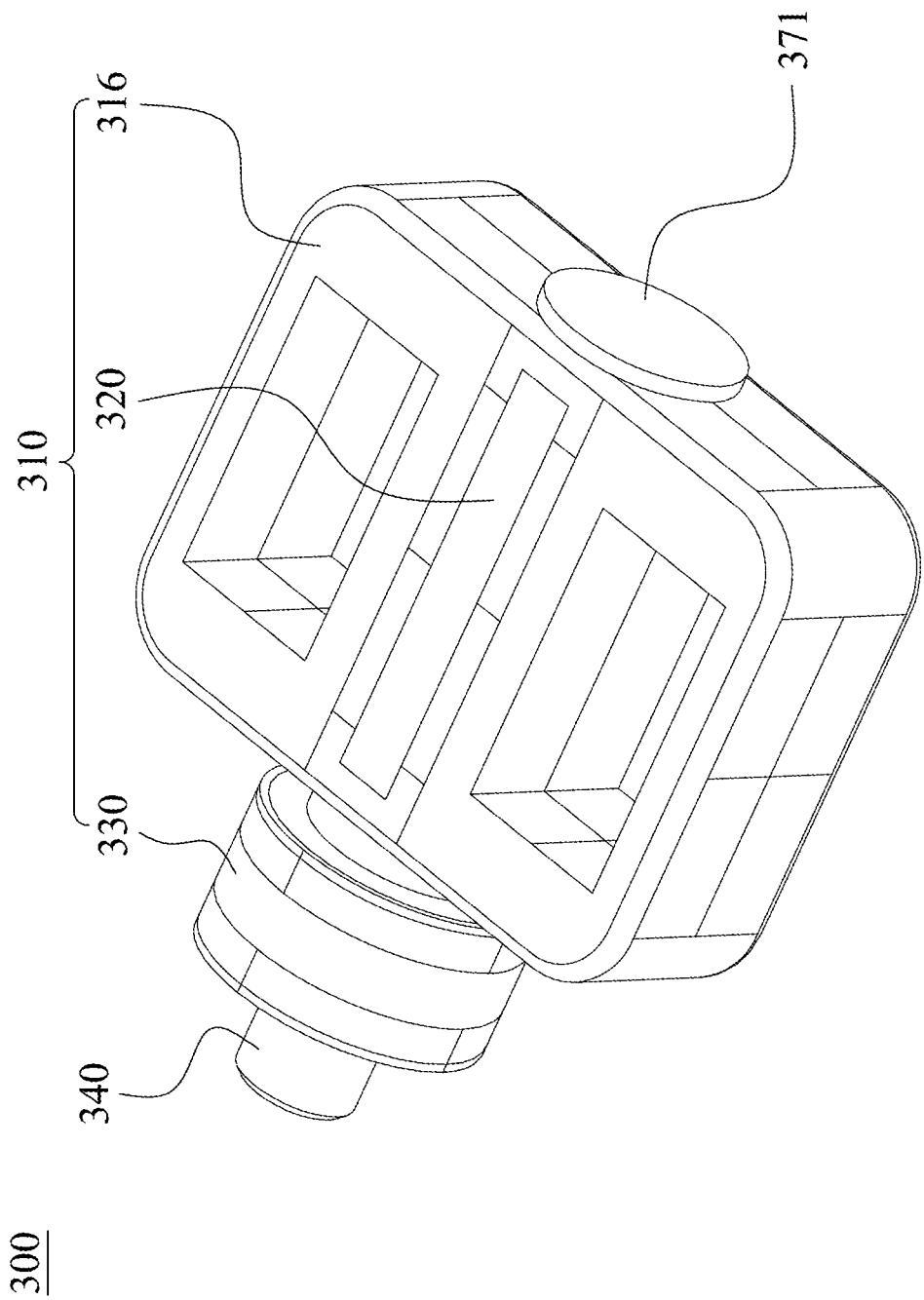
FIG. 3A is a three-dimensional view of a self-powered apparatus according to the 3rd embodiment of the present disclosure.
Figure 3B:
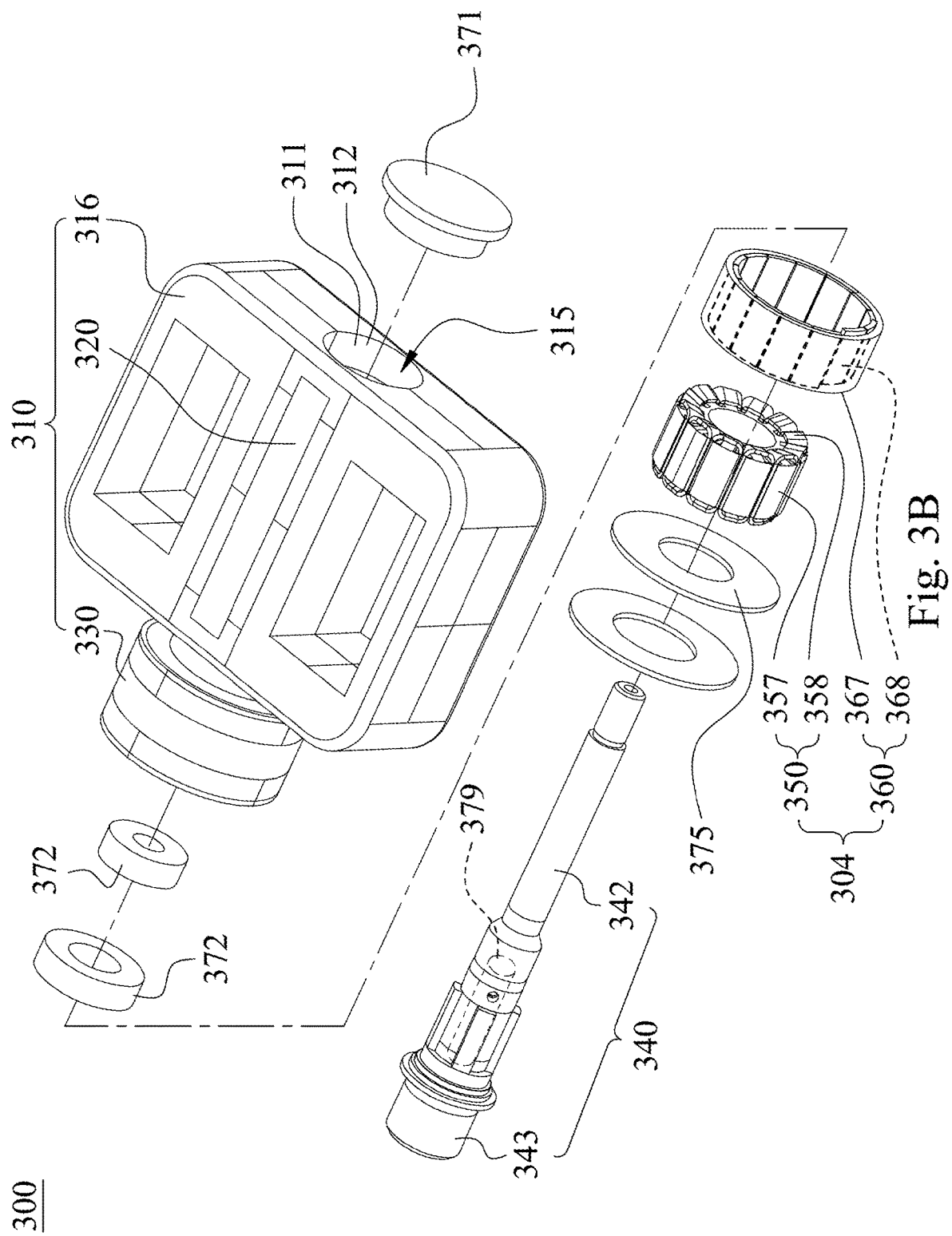
FIG. 3B is an exploded view of the self-powered apparatus according to FIG. 3A of the 3rd embodiment.
Figure 3C:
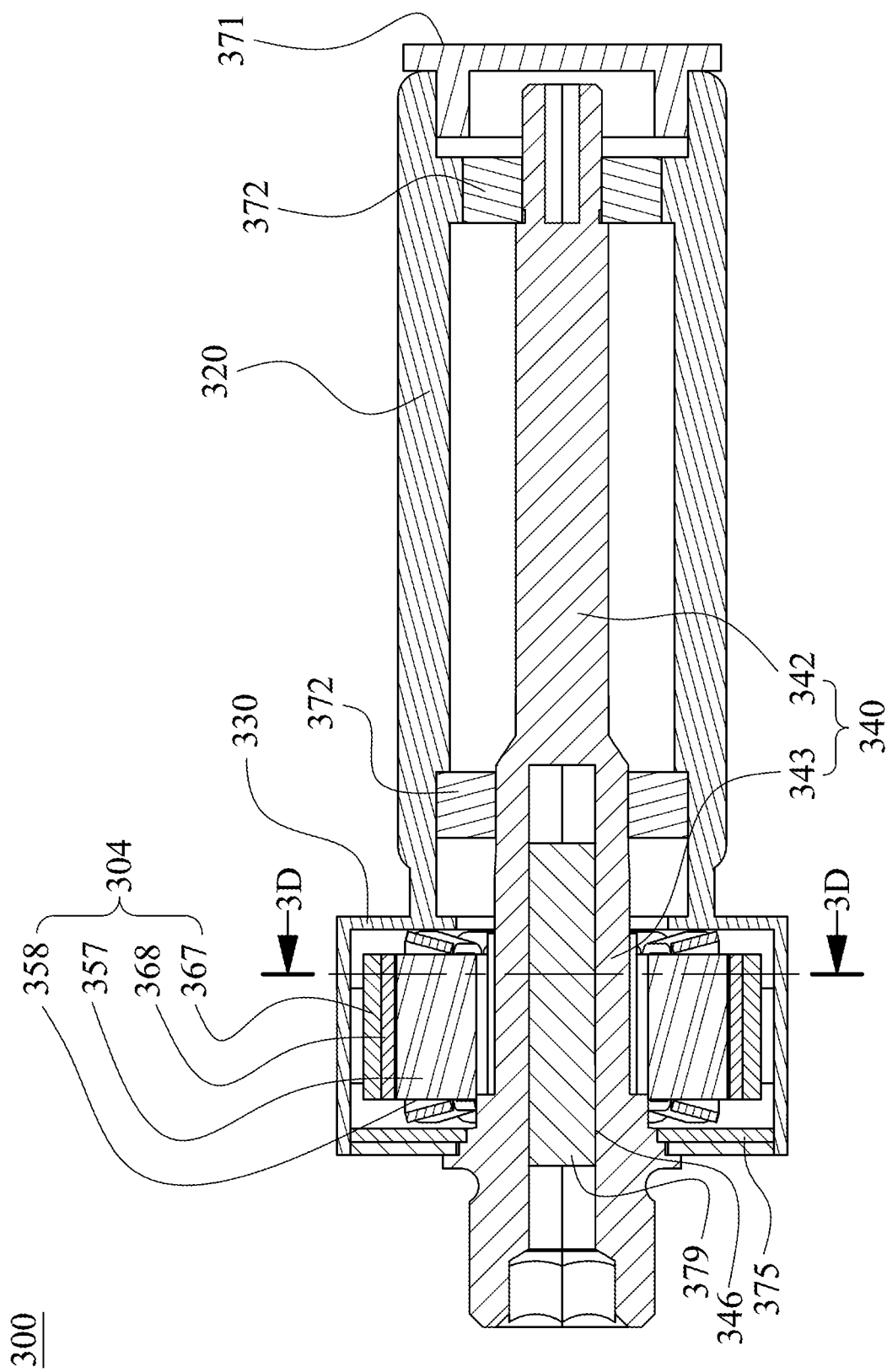
FIG. 3C is a longitudinally cross-sectional view of the self-powered apparatus according to FIG. 3A of the 3rd embodiment.

FIG. 3A is a three-dimensional view of a self-powered apparatus 300 according to the 3rd embodiment of the present disclosure. FIG. 3B is an exploded view of the self-powered apparatus 300 according to FIG. 3A of the 3rd embodiment. FIG. 3C is a longitudinally cross-sectional view of the self-powered apparatus 300 according to FIG. 3A of the 3rd embodiment. With reference to FIG. 3A to FIG. 3C, the self-powered apparatus 300 is an apparatus for cycling, e.g., a power pedal apparatus of a bicycle or an indoor exercise bike, especially, an apparatus can generate power while being pedaling to rotate. That is, the self-powered apparatus 300 is a pedaling and rotating apparatus for cycling. The self-powered apparatus 300 includes a pedal unit 310, a spindle 340, a generator 304 and an energy storage element 379. The pedal unit 310 includes an inner surface 311 to form and surround an accommodating space 315 therein, and it is can be also stated that the pedal unit 310 includes the accommodating space 315 to form the inner surface 311 therein. An opening of the pedal unit 310 may be closed by an end cap 371. The spindle 340 is accommodated in the accommodating space 315.

Figure 3D:
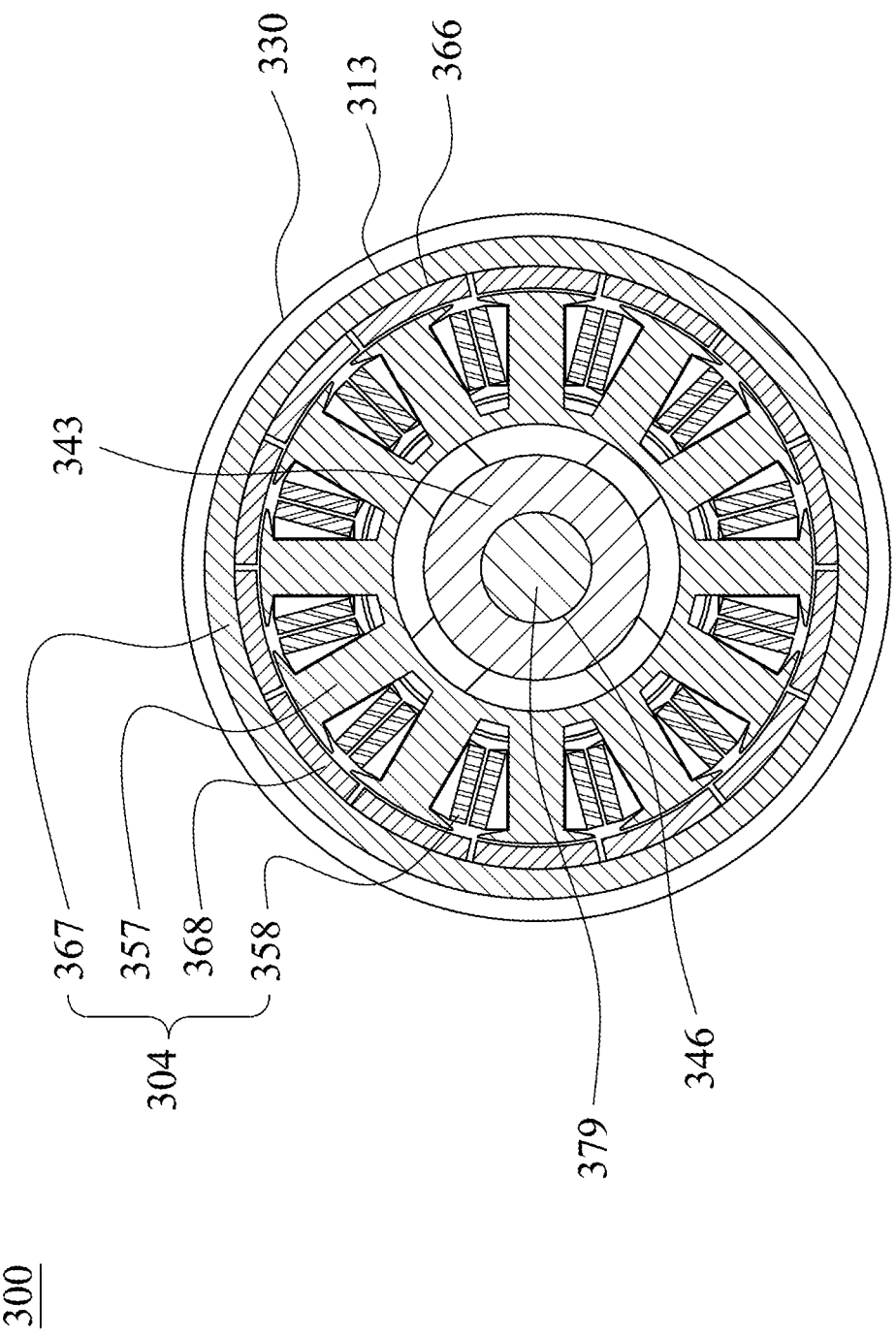
FIG. 3D is a cross-sectional view along line 3D-3D of FIG. 3C.

FIG. 3D is a cross-sectional view along line 3D-3D of FIG. 3C. With reference to FIG. 3B to FIG. 3D, the generator 304 includes at least a stator 350 and a rotor 360. The stator 350 is disposed on the spindle 340, the rotor 360 is disposed on a base inner surface 313 (i.e., a portion of the inner surface 311 for receiving and equipping the rotor 360) of the pedal unit 310, and the rotor 360 surrounds the stator 350 correspondingly and is non-contact with the stator 350. The energy storage element 379 is electrically coupled to the generator 304. When the pedal unit 310 is being pedaled to rotate by the rider, the stator 350 is fixed on the spindle 340, the rotor 360 rotates relatively to the stator 350 and along with the pedal unit 310, and a power is generated by the generator 304 to charge the energy storage element 379.

In detail, the pedal unit 310 further includes a pedal body 320, two pedal plates 316 and a pedal base cover 330, the two pedal plates 316 are connected to the pedal body 320 to be extended along two ends, respectively, of a vertical direction of the spindle 340, and the two pedal plates 316 are chosen from a flat type as an exemplary example. The pedal base cover 330 is connected to the pedal body 320. The pedal base cover 330 and the pedal body 320 are substantially tubular-shaped, and the pedal base cover 330 is an extended cover connected to the pedal body 320 and can be rotated along with the pedal body 320 via two bearings 372. When a bicycle includes the self-powered apparatus 300 as a power pedal apparatus thereof, the pedal base cover 330 is located more adjacent to a crank arm of the bicycle than the pedal body 320. The inner surface 311 of the pedal unit 310 includes a body inner surface 312 located within and on the pedal body 320 and the base inner surface 313 located within and on the pedal base cover 330. The spindle 340 includes a body portion 342 located correspondingly to and inside the body inner surface 312, and the spindle 340 further includes a base portion 343 located correspondingly to and inside the base inner surface 313. The stator 350 is disposed on the base portion 343 of the spindle 340, and the rotor 360 is disposed on the base inner surface 313. The body portion 342 is disposed closer to the two pedal plates 316 of the pedal unit 310 than the base portion 343 thereto. When a bicycle includes the self-powered apparatus 300 as a power pedal apparatus thereof, the body portion 342 is located between two bearings 372, and the base portion 343 is located adjacent to a crank arm of the bicycle. Therefore, the generator 304 is advantageous in employing the intrinsic rotating property of the self-powered apparatus 300 to save and harvest more power while neither increasing the volume nor changing the outer shape of the self-powered apparatus 300.

The self-powered apparatus 300 may further include a plurality of sensors (not shown in drawings) being strain gauges and power-supplied by the energy storage element 379. The energy storage element 379 and the sensors may be disposed adjacent to the base portion 343 and covered by the pedal base cover 330.

Figure 3E:
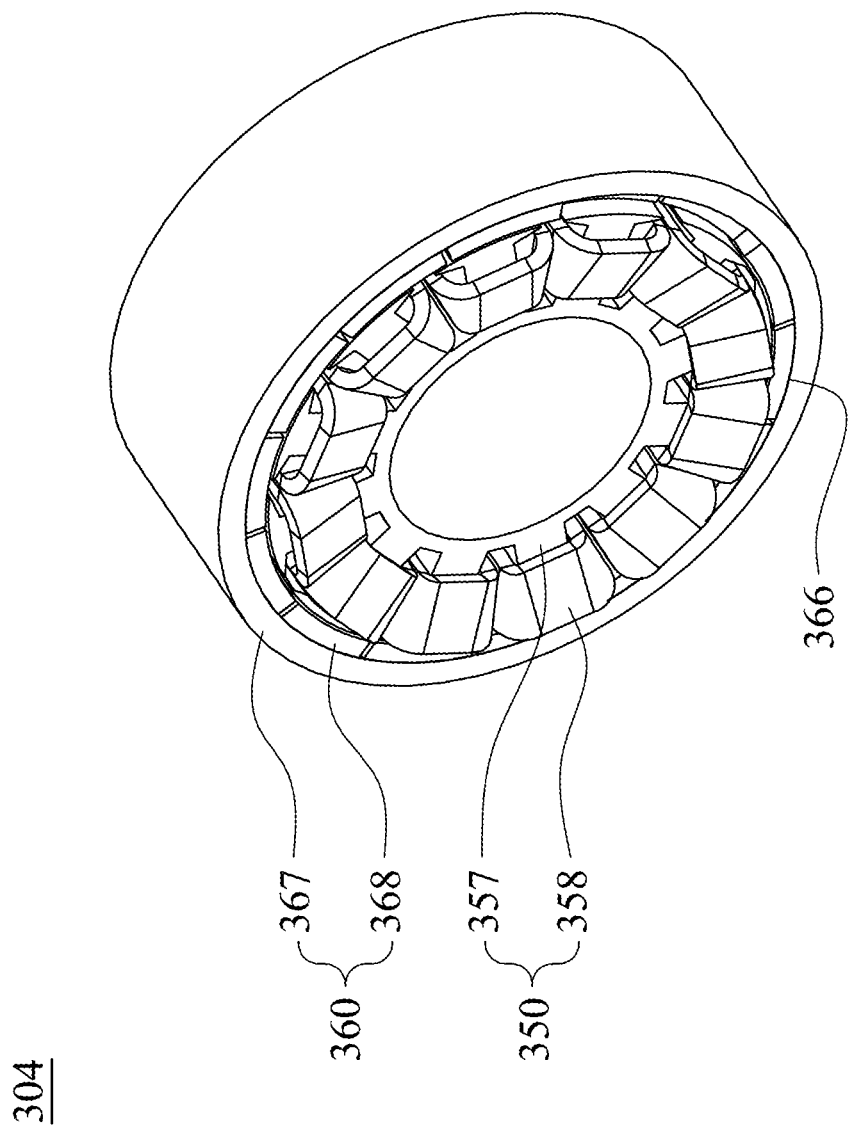
FIG. 3E is a three-dimensional view of a generator of the self-powered apparatus according to the 3rd embodiment.
Figure 3G:
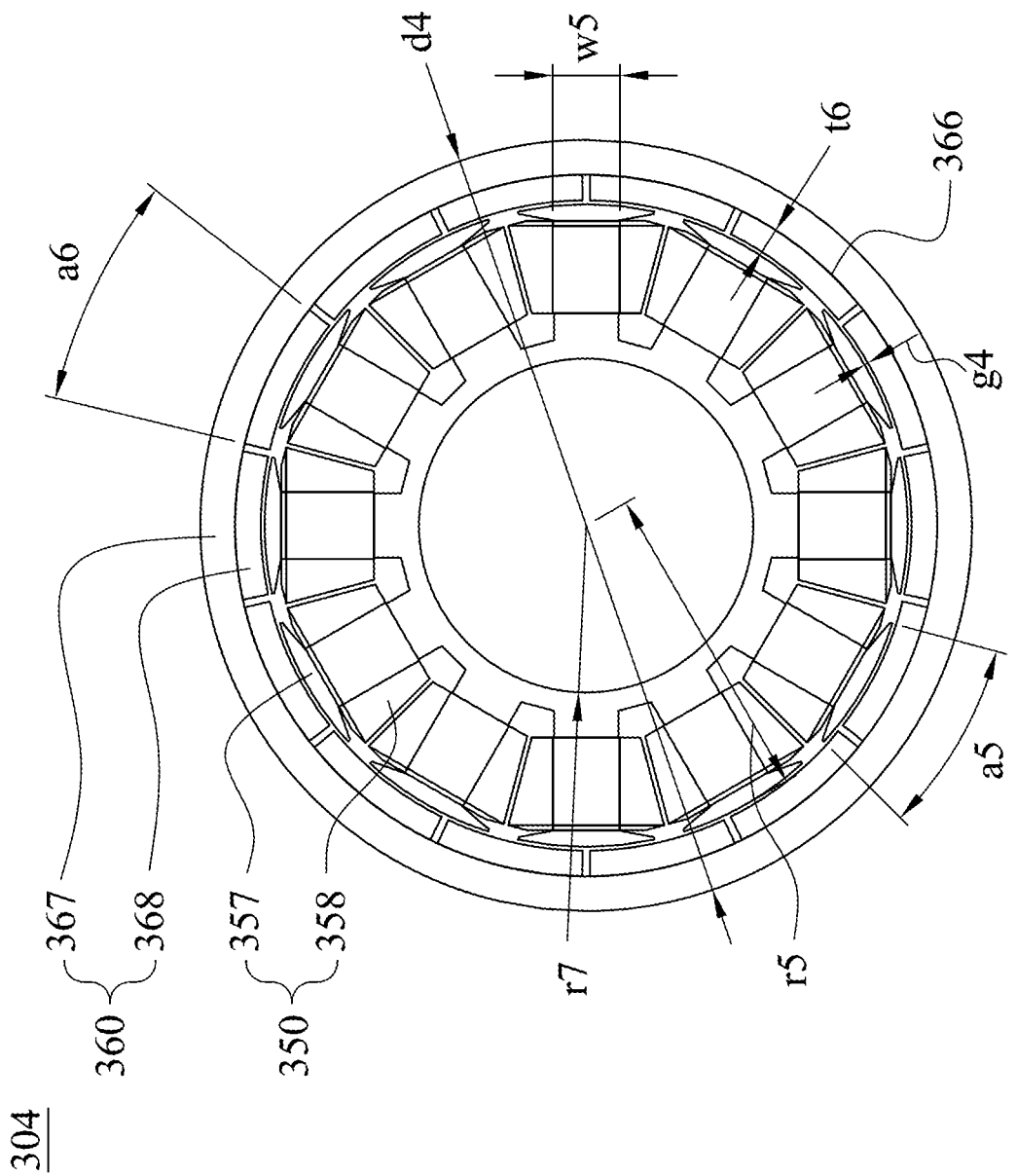
FIG. 3G is a schematic view of parameters of the generator of the self-powered apparatus according to FIG. 3E of the 3rd embodiment.

FIG. 3E is a three-dimensional view of a generator 304 of the self-powered apparatus 300 according to the 3rd embodiment. FIG. 3F is a side view of the generator 304 of the self-powered apparatus 300 according to FIG. 3E of the 3rd embodiment. FIG. 3G is a schematic view of parameters of the generator 304 of the self-powered apparatus 300 according to FIG. 3E of the 3rd embodiment. With reference to FIG. 3E and FIG. 3G, the stator 350 of the generator 304 includes 12 stator teeth 357 and 12 stator coils 358, which are wound around the 12 stator teeth 357, respectively. The rotor 360 of the generator 304 includes a rotor yoke 367 and 14 rotor magnets 368, which are attached in order along a yoke inner surface 366 of the rotor yoke 367 being tubular-shaped. An arc length a5 of each of the stator teeth 357 is smaller than an arc length a6 of each of the rotor magnets 368, as shown in FIG. 3G.

A number of the stator teeth 357 may be in a range of 3 to 18 or in a range of 10 to 14. A number of the rotor magnets 368 may be in a range of 2 to 22 or in a range of 12 to 16. An outer diameter d4 of the generator 304 may be in a range of 20 mm to 40 mm or in a range of 27 mm to 33 mm. A thickness t4 of the generator 304 may be in a range of 5 mm to 20 mm or in a range of 9 mm to 13 mm. An air gap g4 between the stator 350 and the rotor 360 may be in a range of 0.10 mm to 0.30 mm or in a range of 0.12 mm to 0.18 mm. A winding number of each of the stator coils 358 may be in a range of 150 turns to 400 turns or in a range of 260 turns to 290 turns. Therefore, one of the key problems being overcome by the present disclosure is that it is difficult to design a suitable generator 304 in a limited space to generate sufficient electric power for charging the energy storage element 379, while the power generated by the micro generator 304 is usually proportional to the size or volume of the generator 304 itself.

As an exemplary example but not limited to, the generator 304 formed with AC three-phase structures is disposed on the pedal base cover 330 corresponding to the base portion 343 of the spindle 340 and includes 12 slots and 14 poles. The stator 350 has 12 teeth, and the rotor 360 has 14 poles. The winding number of each of the stator coils 358 is 275 turns. A magnet material of each of the rotor magnets 368 is rubidium iron boron (NdFeB) and a magnetic grade thereof is N42. The arc length of each of the stator teeth 357 is a5, the arc length of each of the rotor magnets 368 is a6, the outer diameter of the generator 304 is d4, the thickness of the generator 304 is t4, a thickness of each of the rotor magnets 368 is t6, the air gap between the stator 350 and the rotor 360 is g4, a width of each of the stator teeth 357 is w5, an outer radius of the stator 350 is r5, an inner radius of the stator 350 is r7, and the values of the aforementioned parameters shown in FIG. 3F and FIG. 3G of the 3rd embodiment are listed in the following Table 4.

TABLE 4

| a5 (mm) | 5.34 | g4 (mm) | 0.15 |
|---|---|---|---|
| a6 (mm) | 5.82 | w5 (mm) | 2.50 |
| d4 (mm) | 30.00 | r5 (mm) | 12.50 |
| t4 (mm) | 11.00 | r7 (mm) | 6.50 |
| t6 (mm) | 1.00 | | |

With reference to FIG. 3B and FIG. 3C, the self-powered apparatus 300 further includes a circuit board 375 disposed around the base portion 343 of the spindle 340. The circuit board 375 is an annular-shaped PCB to surround the base portion 343, and a normal direction of a surface of the circuit board 375 is parallel to the base portion 343, i.e., the surface of the circuit board 375 is perpendicular to the base portion 343. The energy storage element 379 is disposed in a spindle accommodating space surrounded by a spindle inner surface 346 of the base portion 343. The circuit board 375 is configured to support a rectifying circuitry, a DC converting circuitry for the energy storage element 379 and a supplying circuitry for the sensors. The wires electrically connected among the generator 304, the circuit board 375, the energy storage element 379 and the sensors are omitted in the drawings. Further, the self-powered apparatus 300 excludes or lacks both a speed-increasing mechanism and a speed-decelerating mechanism. In addition, the self-powered apparatus 300 may further include another circuit board, which is an FPCB for disposing the sensors or a PCB. The circuit board 375 and the another circuit board are electrically coupled.

Figure 3H:
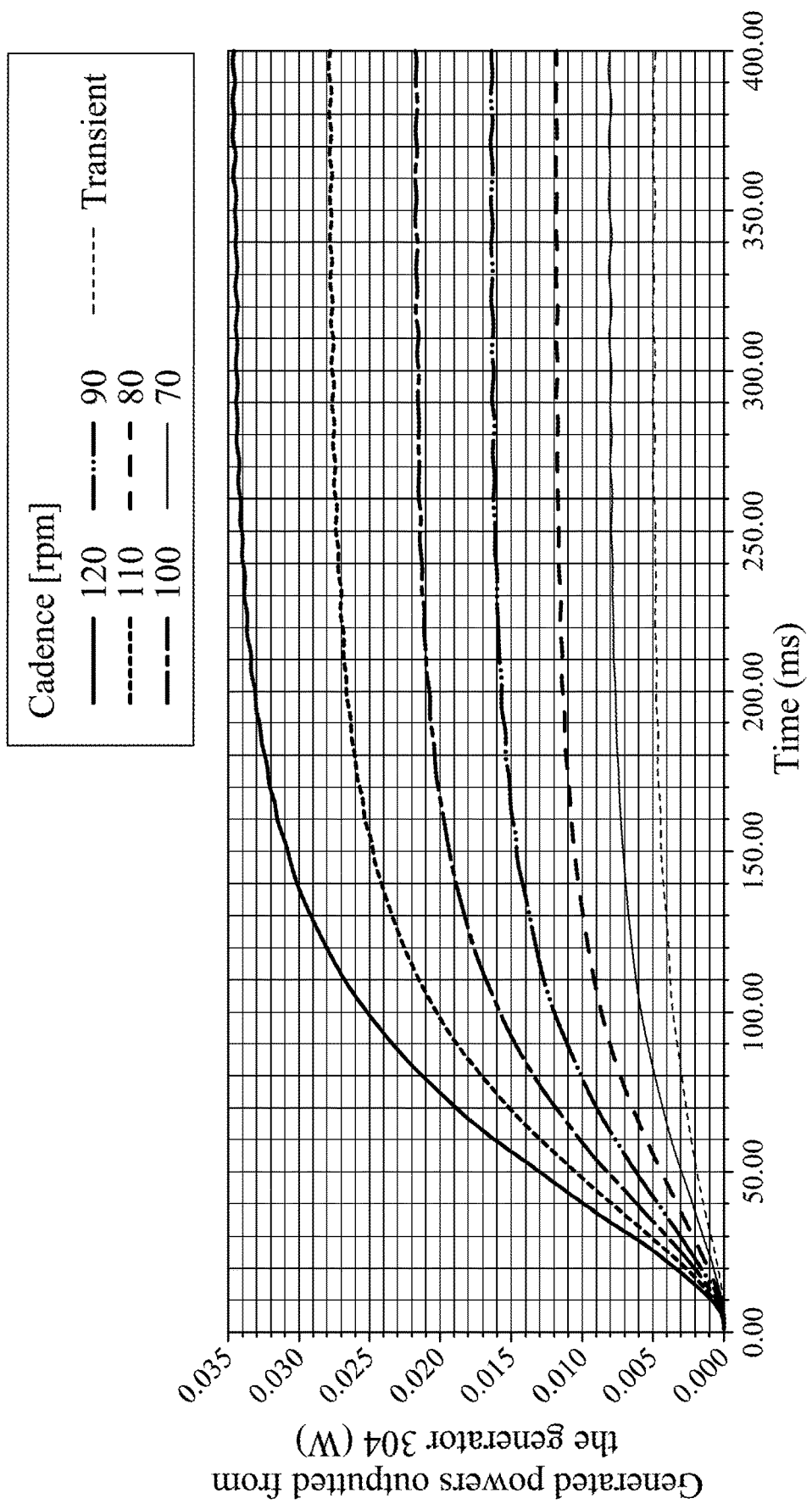
FIG. 3H is a schematic view of a generated power outputted from the generator of the self-powered apparatus corresponding to different pedaling cadence speeds according to the 3rd embodiment.
Figure 3I:
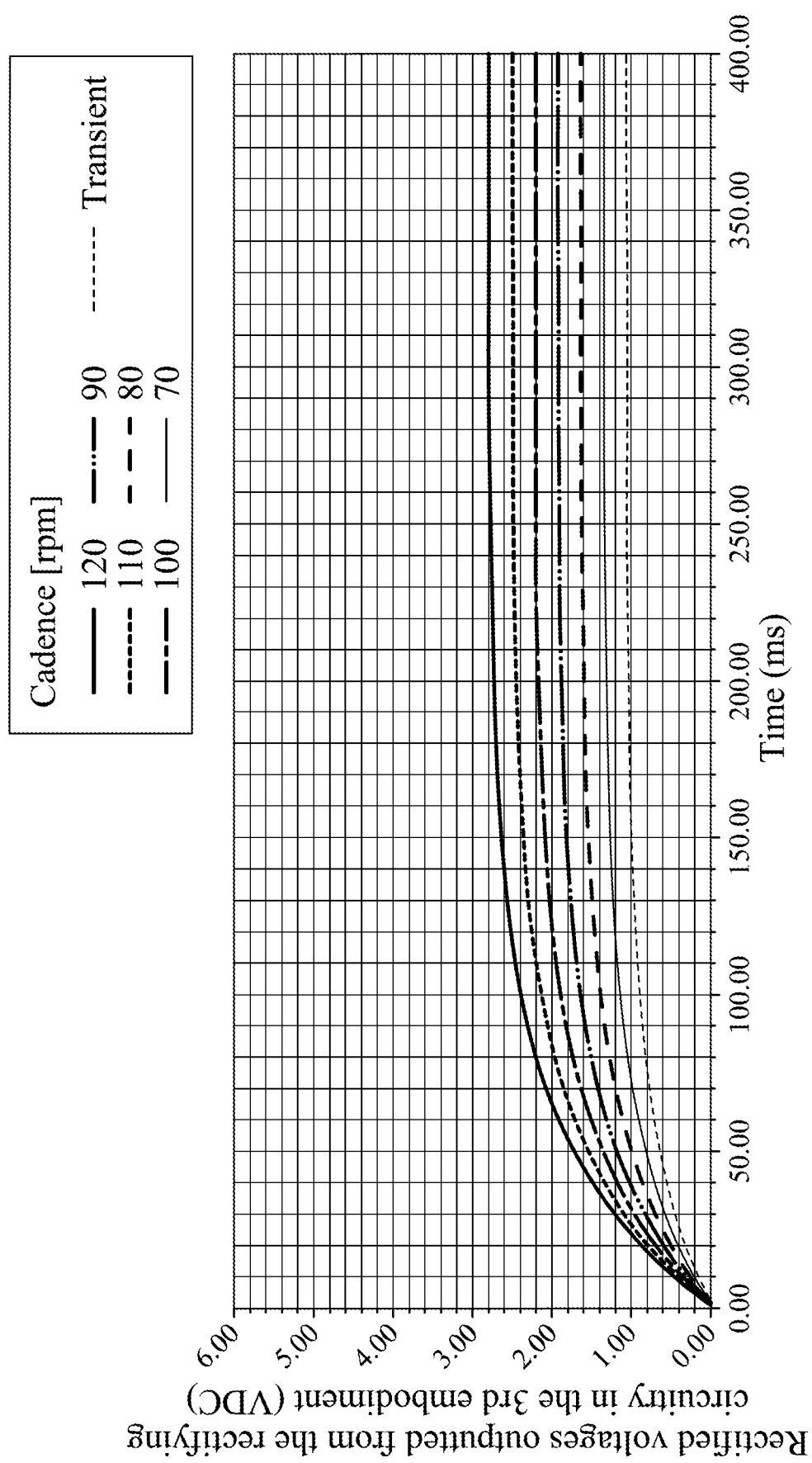
FIG. 3I is a schematic view of a rectified voltage outputted from a rectifying circuitry of the self-powered apparatus corresponding to different pedaling cadence speeds according to the 3rd embodiment.

FIG. 3H is a schematic view of the generated power outputted from the generator 304 of the self-powered apparatus 300 corresponding to different pedaling cadence speeds according to the 3rd embodiment, FIG. 3I is a schematic view of a rectified voltage outputted from the rectifying circuitry of the self-powered apparatus 300 corresponding to different pedaling cadence speeds according to the 3rd embodiment, and the block diagram of the self-powered apparatus 100 shown in FIG. 1H according to the 1st embodiment may be referred for the self-powered apparatus 300 according to the 3rd embodiment. With reference to FIG. 3H and FIG. 3I, a properly pedaling cadence speed of the rotor 360 may be in a range of 60 rpm (i.e., the cadence speed around the status of transient) to 120 rpm. The generated power outputted from the generator 304 may be in a range of 3.4 mW to 34.5 mW or in a range of 5 mW to 34.5 mW. In detail, when the pedaling cadence speed of the rotor 360 is in a range of 60 rpm to 80 rpm, the generated power outputted from the generator 304 may be around in a range of 5 mW to 11.8 mW; when the pedaling cadence speed of the rotor 360 is in a range of 80 rpm to 100 rpm, the generated power outputted from the generator 304 may be around in a range of 11.8 mW to 21.7 mW; when the pedaling cadence speed of the rotor 360 is in a range of 100 rpm to 120 rpm, the generated power outputted from the generator 304 may be around in a range of 21.7 mW to 34.5 mW. The rectifying circuitry may be configured between the generator 304 and the energy storage element 379, and the rectified voltage outputted from the rectifying circuitry may be around in a range of 0.5 VDC to 9 VDC or in a range of 1.01 VDC to 2.6 VDC depending upon the various parameters designed for the generator 304. The DC converted voltage outputted from the DC converting circuitry may be in a range of 4.15 VDC to 4.2 VDC. Therefore, the generator 304 designed in the limited space in the self-powered apparatus 300 is beneficial to generate enough power and proper voltage to effectively charge the energy storage element 179 and then supply the sensors disposed therein. In addition, there may be an external charging interface, e.g., USB ports, electrically coupled to the energy storage element 379 for externally charging the energy storage element 379, as a charging option.

In the 3rd embodiment, the relationships between the pedaling cadence (frequency) speeds of a transient state, 70, 80, 90, 100, 110 and 120 (rpm) and the generated powers outputted from the generator 304 may be shown in FIG. 3H. Average generated powers of all the curves in FIG. 3H corresponding to the pedaling cadence speeds, respectively, are shown in the following Table 5, and the average generated powers shown therein are calculated from 300 ms to 400 ms of a steady state. It shows that a specifically generated power is about 8.0 mW at the pedaling cadence speed of 70 rpm in FIG. 3H and Table 5. The relationships between the pedaling cadence speeds of the transient state, 70, 80, 90, 100, 110 and 120 (rpm) and the rectified voltages outputted from the rectifying circuitry may be shown in FIG. 3I. Average rectified voltages of all the curves in FIG. 3I corresponding to the pedaling cadence speeds, respectively, are shown in the following Table 6, and the average rectified voltages shown therein are calculated from 300 ms to 400 ms of the steady state. There are many parameters of the generator 304 should be well designed to achieve sufficient induced voltage levels to generate sufficient charging power without any speed-adjusting mechanism in the present disclosure. After the induced back EMF generated from the generator 304 is rectified by the rectifying circuitry, boosted and stabilized by the DC converting circuitry, the DC converted voltage with the proper voltage level can be outputted from the DC converting circuitry and inputted to the energy storage element 379, and the energy storage element 379 can be charged accordingly.

When the pedaling cadence speed of the rotor 360 is in the range of 60 rpm to 120 rpm, the generated power outputted from the generator 304 may increase at least 20% while the pedaling cadence speed increasing 10 rpm. As an exemplary example but not limited to, the generated power outputted from the generator 304 may increase 38.98% while the pedaling cadence speed of 80 rpm increasing to 90 rpm, i.e., while the pedaling cadence speed increasing or being added by 10 rpm from 80 rpm. In detail, as shown in Table 5, the generated power is 11.8 mW at the pedaling cadence speed of 80 rpm, the generated power is 16.4 mW at the pedaling cadence speed of 90 rpm, and thereby the generated power outputted from the generator 304 increases 38.98% (calculated according to (16.4-11.8)/11.8*100%) while the pedaling cadence speed increasing 10 rpm (calculated according to 90 rpm minus 80 rpm) from 80 rpm.

TABLE 5

| Cadence (rpm) | Transient | 70 | 80 | 90 | 100 | 110 | 120 |
|---|---|---|---|---|---|---|---|
| Avg. Power (W) | 0.0050 | 0.0080 | 0.0118 | 0.0164 | 0.0217 | 0.0277 | 0.0345 |

TABLE 6

| Cadence (rpm) | Transient | 70 | 80 | 90 | 100 | 110 | 120 |
|---|---|---|---|---|---|---|---|
| Avg. Voltage (V) | 1.0563 | 1.3411 | 1.6319 | 1.9203 | 2.2081 | 2.4970 | 2.7857 |

Figure 4:
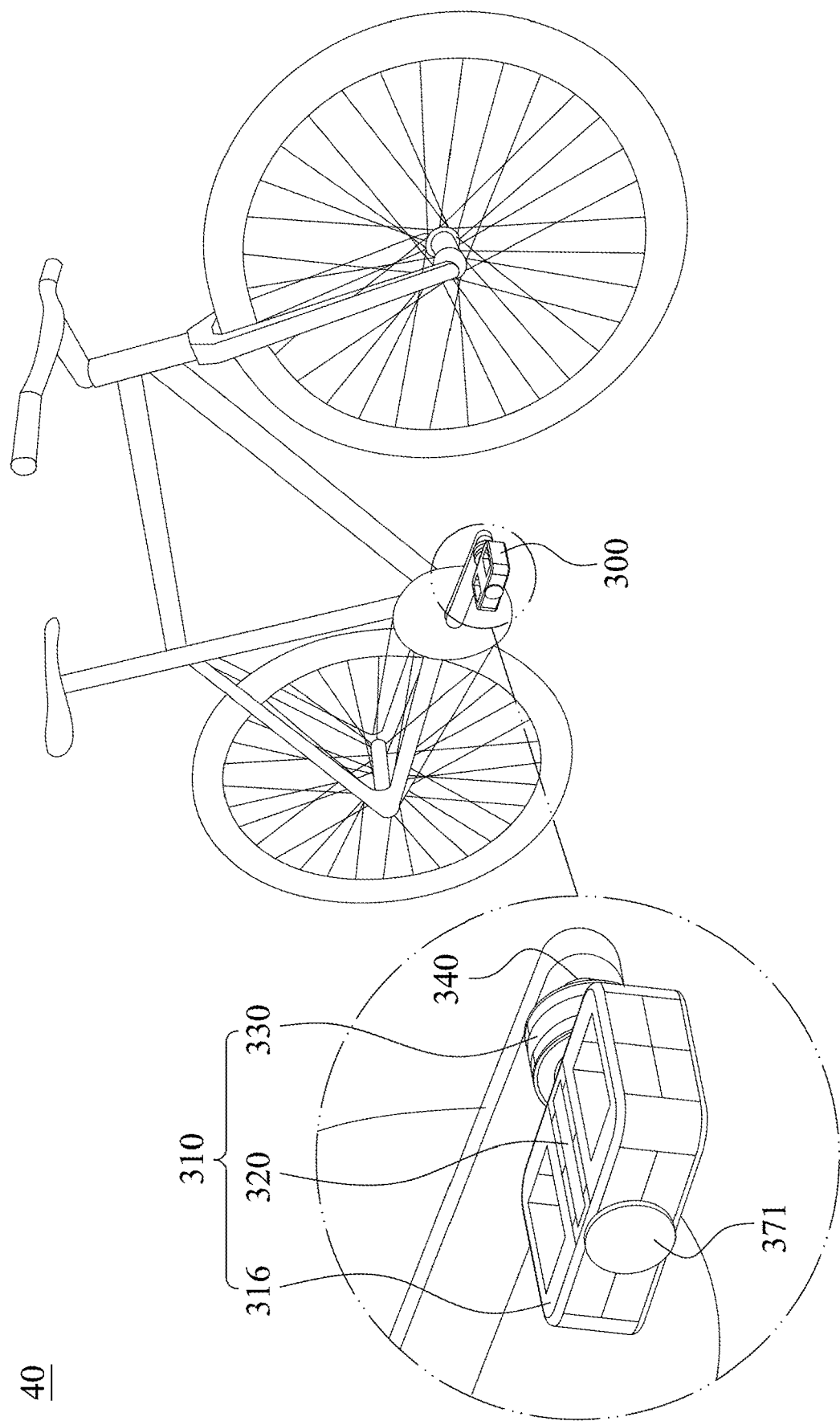
FIG. 4 is a schematic view of a bicycle according to the 4th embodiment of the present disclosure.

FIG. 4 is a schematic view of a bicycle 40 according to the 4th embodiment of the present disclosure. With reference to FIG. 4, the bicycle 40 includes the self-powered apparatus 300 according to the 3rd embodiment of the present disclosure. The self-powered apparatus 300 is a power pedal apparatus of the bicycle 40. Therefore, the self-powered apparatus 300 of the bicycle 40 with active power supply including the generator 304 for energy harvesting in the present disclosure is beneficial to extend usage time of the self-powered apparatus 300.

Figure 5:
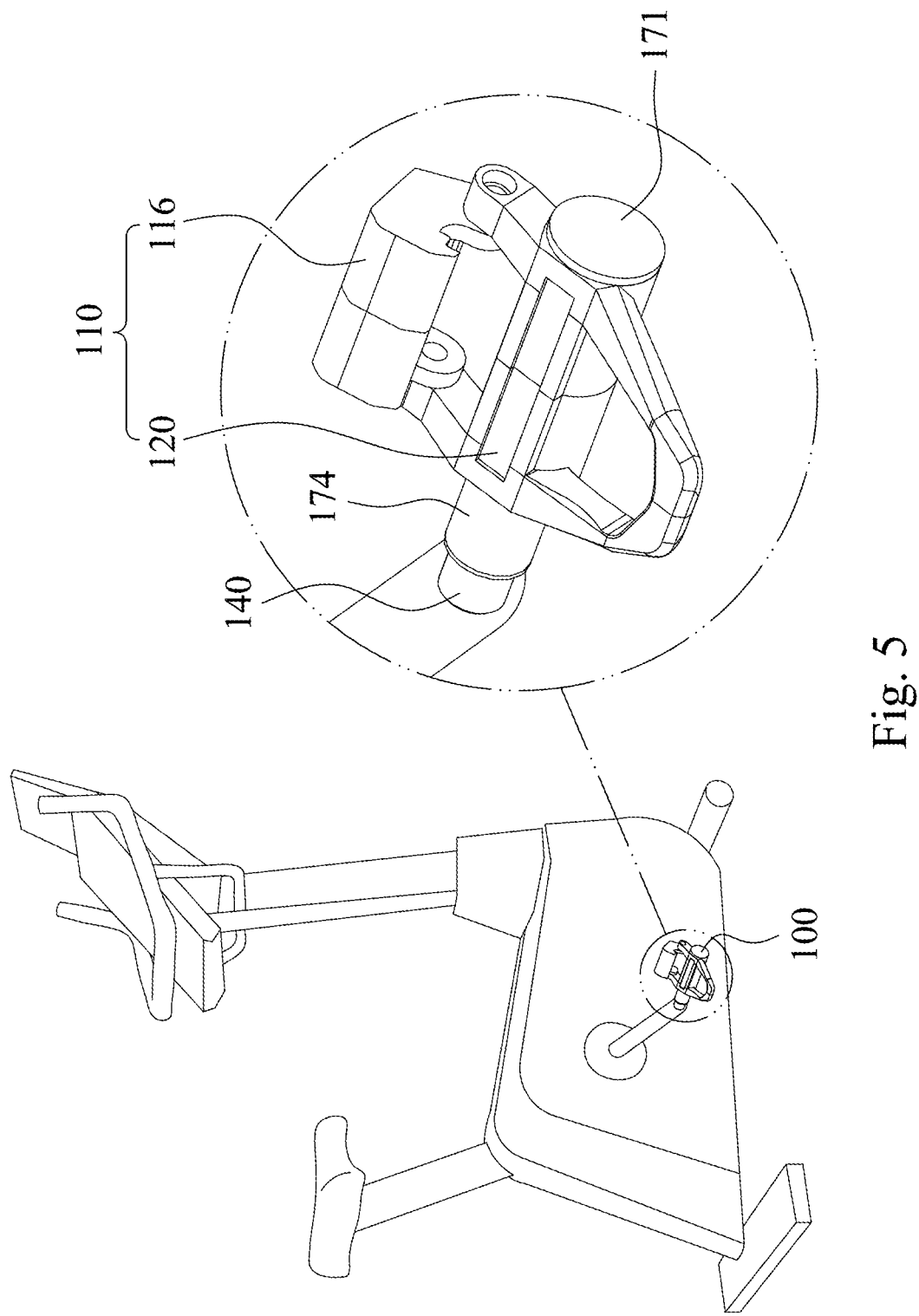
FIG. 5 is a schematic view of an indoor exercise bike according to the 5th embodiment of the present disclosure.

FIG. 5 is a schematic view of an indoor exercise bike 50 according to the 5th embodiment of the present disclosure. With reference to FIG. 5, the indoor exercise bike 50 includes the self-powered apparatus 100 according to the 1st embodiment of the present disclosure. The self-powered apparatus 100 is a power pedal apparatus of the indoor exercise bike 50. Therefore, the self-powered apparatus 100 of the indoor exercise bike 50 with active power supply including the generator 104 for energy harvesting in the present disclosure is beneficial to extend usage time of the self-powered apparatus 100.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A self-powered apparatus, being a pedaling and rotating apparatus for cycling, comprising:
a pedal unit comprising an inner surface to form an accommodating space therein;
a spindle accommodated in the accommodating space and comprising a body portion and a base portion, wherein the body portion is disposed closer to at least one pedal plate of the pedal unit than the base portion thereto;
a generator comprising a stator and a rotor, wherein the stator is disposed on the spindle, the rotor is disposed on the inner surface of the pedal unit, and the rotor surrounds the stator correspondingly and is non-contact with the stator;
an energy storage element electrically coupled to the generator and disposed adjacent to the base portion, wherein the energy storage element is surrounded by a spindle inner surface of the base portion;
at least one sensor being power-supplied by the energy storage element and disposed adjacent to the base portion; and
at least one circuit board disposed around the base portion, wherein the at least one circuit board supports a rectifying circuitry for the energy storage element and a supplying circuitry for the sensor;
wherein when the pedal unit is being pedaled to rotate by a rider, the stator is fixed on the spindle, the rotor rotates relatively to the stator and along with the pedal unit, and a generated power is generated by the generator to charge the energy storage element.

2. The self-powered apparatus of claim 1, wherein the stator comprises a plurality of stator teeth and a plurality of stator coils, which are wound around the stator teeth, respectively;

wherein the rotor comprises a rotor yoke and a plurality of rotor magnets, which are attached in order along a yoke inner surface of the rotor yoke, and an arc length of each of the stator teeth is smaller than or equal to an arc length of each of the rotor magnets.

3. The self-powered apparatus of claim 2, wherein the pedal unit further comprises a pedal body, the at least one pedal plate is connected to the pedal body to be extended along a vertical direction of the spindle, the pedal body is substantially tubular-shaped, the inner surface comprises a body inner surface located within and on the pedal body, and the body portion is located correspondingly to and inside the body inner surface;

wherein the stator is disposed on the body portion of the spindle, and the rotor is disposed on the body inner surface.

4. The self-powered apparatus of claim 3, wherein an outer diameter of the generator is in a range of 10 mm to 30 mm, and a thickness of the generator is in a range of 20 mm to 60 mm.

5. The self-powered apparatus of claim 4, wherein a number of the stator teeth is in a range of 3 to 12, and a number of the rotor magnets is in a range of 2 to 16.

6. The self-powered apparatus of claim 4, wherein an air gap between the stator and the rotor is in a range of 0.10 mm to 0.30 mm, and a winding number of each of the stator coils is in a range of 250 turns to 500 turns.

7. The self-powered apparatus of claim 2, wherein the pedal unit further comprises a pedal body and a pedal base cover, the at least one pedal plate is connected to the pedal body to be extended along a vertical direction of the spindle, the pedal base cover is connected to the pedal body, the pedal base cover and the pedal body are substantially tubular-shaped, the inner surface comprises a base inner surface located within and on the pedal base cover, and the base portion is located correspondingly to and inside the base inner surface;

wherein the stator is disposed on the base portion of the spindle, and the rotor is disposed on the base inner surface.

8. The self-powered apparatus of claim 7, wherein an outer diameter of the generator is in a range of 20 mm to 40 mm, and a thickness of the generator is in a range of 5 mm to 20 mm.

9. The self-powered apparatus of claim 8, wherein a number of the stator teeth is in a range of 3 to 18, and a number of the rotor magnets is in a range of 2 to 22.

10. The self-powered apparatus of claim 8, wherein an air gap between the stator and the rotor is in a range of 0.10 mm to 0.30 mm, and a winding number of each of the stator coils is in a range of 150 turns to 400 turns.

11. The self-powered apparatus of claim 1, wherein when a pedaling cadence speed of the rotor is in a range of 60 rpm to 80 rpm, the generated power outputted from the generator is in a range of 3.4 mW to 11.8 mW;

wherein when the pedaling cadence speed of the rotor is in a range of 80 rpm to 100 rpm, the generated power outputted from the generator is in a range of 8.1 mW to 21.7 mW;

wherein when the pedaling cadence speed of the rotor is in a range of 100 rpm to 120 rpm, the generated power outputted from the generator is in a range of 14.7 mW to 34.5 mW;

wherein the rectifying circuitry is configured between the generator and the energy storage element, and a rectified voltage outputted from the rectifying circuitry is in a range of 0.5 VDC to 9 VDC.

12. The self-powered apparatus of claim 1, wherein when a pedaling cadence speed of the rotor is in a range of 60 rpm to 120 rpm, the generated power outputted from the generator increases at least 20% while the pedaling cadence speed increasing 10 rpm.

13. The self-powered apparatus of claim 1, wherein the sensor is a strain gauge, a number of the sensor is at least two, a number of the circuit board is at least two, and the sensors and the circuit boards are alternately and symmetrically arranged around the base portion of the spindle.

14. The self-powered apparatus of claim 1, wherein the circuit board is an annular-shaped PCB to surround the base portion, and a normal direction of a surface of the circuit board is parallel to the base portion.

15. The self-powered apparatus of claim 1, wherein the self-powered apparatus excludes both a speed-increasing mechanism and a speed-decelerating mechanism.

16. A bicycle, comprising:
the self-powered apparatus of claim 1, wherein the self-powered apparatus is a power pedal apparatus of the bicycle.

17. An indoor exercise bike, comprising:
the self-powered apparatus of claim 1, wherein the self-powered apparatus is a power pedal apparatus of the indoor exercise bike.

* * * * *